US012763633B2

(12) United States Patent
Freddi

(10) Patent No.: US 12,763,633 B2
(45) Date of Patent: Oct. 13, 2026

(54) CASING FOR ELECTRIC MOTOR, ELECTRIC MOTOR COMPRISING THE CASING AND METHOD FOR THE PRODUCTION THEREOF

(71) Applicant: FIRA S.P.A., Terre del Reno (IT)

(72) Inventor: Roberto Freddi, Terre del Reno (IT)

(73) Assignee: FIRA S.P.A., Terre del Reno (IT)

( * ) Notice: Subject to any disclaimer, the term of this patent is extended or adjusted under 35 U.S.C. 154(b) by 316 days.

(21) Appl. No.: 18/562,935

(22) PCT Filed: May 24, 2022

(86) PCT No.: PCT/EP2022/063964

§ 371 (c)(1),
(2) Date: Nov. 21, 2023

(87) PCT Pub. No.: WO2022/248429

PCT Pub. Date: Dec. 1, 2022

(65) Prior Publication Data

US 2024/0250577 A1 Jul. 25, 2024

(30) Foreign Application Priority Data

May 25, 2021 (IT) ........................ 102021000013457

(51) Int. Cl.
*H02K 5/20* (2006.01)
*H02K 5/173* (2006.01)
*H02K 15/14* (2025.01)

(52) U.S. Cl.
CPC ........... *H02K 5/203* (2021.01); *H02K 5/1732* (2013.01); *H02K 15/14* (2013.01)

(58) Field of Classification Search
CPC .. H02K 5/00; H02K 5/04; H02K 5/20; H02K 5/203; H02K 5/173; H02K 5/1732
USPC ..................................... 361/600–837; 310/89
See application file for complete search history.

(56) References Cited

U.S. PATENT DOCUMENTS

| | | | | |
|---|---|---|---|---|
| 5,859,482 A * | 1/1999 | Crowell | H02K 5/203 310/58 |
| 2005/0151431 A1 * | 7/2005 | Cronin | H02K 5/203 310/58 |
| 2016/0087509 A1 * | 3/2016 | Rippel | H02K 15/14 310/59 |

(Continued)

FOREIGN PATENT DOCUMENTS

| | | | |
|---|---|---|---|
| CN | 102538562 B * | 8/2013 | F28F 9/24 |
| DE | 102011080199 A1 * | 2/2013 | H02K 5/203 |

(Continued)

OTHER PUBLICATIONS

Machine Translation of DE 102011080199 A1 (Year: 2013).*

(Continued)

*Primary Examiner* — Oluseye Iwarere
*Assistant Examiner* — Charlie Frank Mann, Jr.
(74) *Attorney, Agent, or Firm* — McGlew and Tuttle, P.C.

(57) ABSTRACT

The casing for the electric motor is formed, at least partially, by a series of rings joined together, for example through braze welding. The rings have slots that, when the rings are installed and joined together, define one or more cooling channels for a coolant to flow. An electric motor is also disclosed, comprising a casing of this kind, as well as a method for producing the casing.

29 Claims, 17 Drawing Sheets

(56) References Cited

U.S. PATENT DOCUMENTS

| | | | | |
|---|---|---|---|---|
| 2019/0157923 | A1 | 5/2019 | Morgante et al. | |
| 2019/0173332 | A1* | 6/2019 | Ronning | H02K 1/20 |

FOREIGN PATENT DOCUMENTS

| | | | | | |
|---|---|---|---|---|---|
| EP | 0589187 | A1 | * | 3/1994 | H02K 5/203 |
| EP | 0858692 | B1 | * | 8/2001 | H02K 5/20 |
| KR | 20090069065 | A | * | 6/2009 | H02K 5/203 |
| KR | 20140064501 | A | * | 5/2014 | H02K 5/203 |
| WO | WO-9206529 | A1 | * | 4/1992 | H02K 9/197 |
| WO | 2016014849 | A1 | | 1/2016 | |

OTHER PUBLICATIONS

Machine Translation of EP 0589187 A1 (Year: 1994).*
Machine Translation of EP 0858692 B1 (Year: 2001).*
Machine Translation of KR 20090069065 A (Year: 2009).*
Machine Translation of KR 20140064501 A (Year: 2014).*
Machine Translation of WO 9206529 A1 (Year: 1992).*
Machine Translation of CN 102538562 B (Year: 2013).*

* cited by examiner

Fig.11G
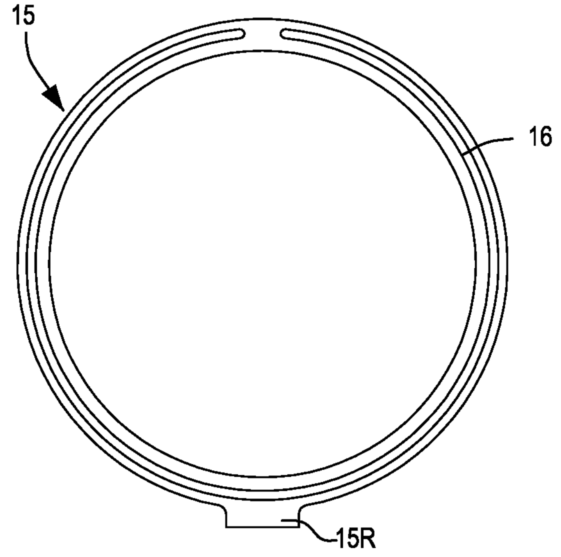
Fig.11H
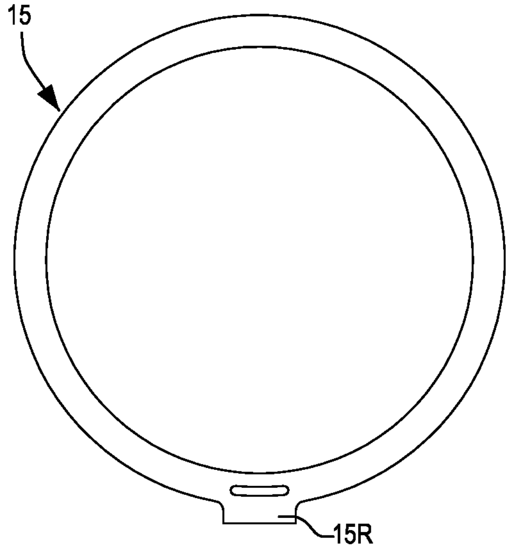
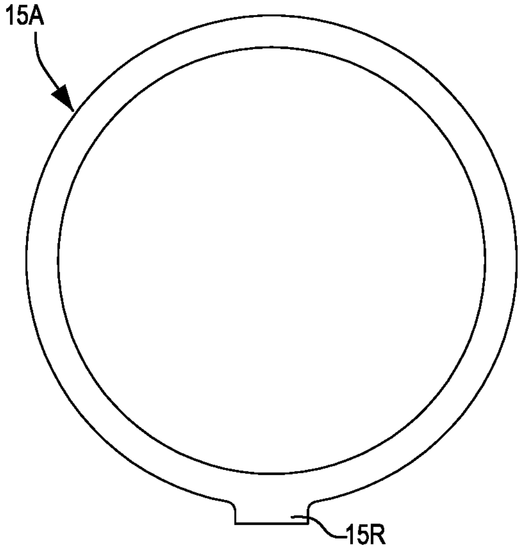
Fig.11I
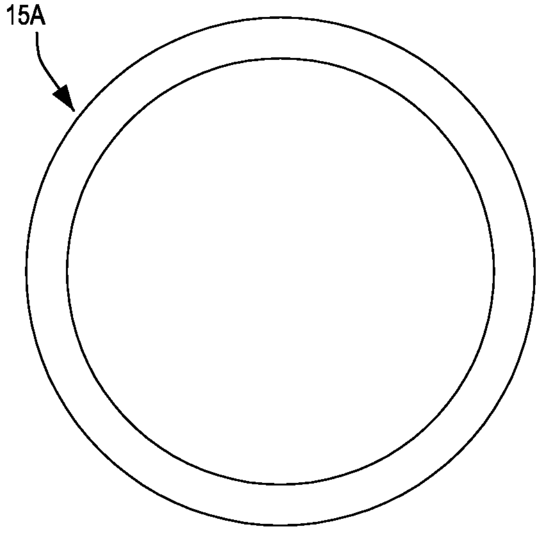
Fig.11J

CASING FOR ELECTRIC MOTOR, ELECTRIC MOTOR COMPRISING THE CASING AND METHOD FOR THE PRODUCTION THEREOF

CROSS REFERENCE TO RELATED APPLICATIONS

This application is a United States National Phase Application of International Application PCT/EP2022/063964, filed May 24, 2022, and claims the benefit of priority under 35 U.S.C. § 119 of Italian Application 102021000013457, filed May 25, 2021, the entire contents of which are incorporated herein by reference.

DESCRIPTION

Technical Field

The present invention relates to innovations in the field of electric motors. More specifically, the invention relates to a casing for an electric motor with a fluid-cooling system, especially a liquid-cooling system.

Background to the Invention

Compared to endothermic engines, electric motors have significantly higher efficiency. Nevertheless, also the motors of this type transform part of the absorbed electrical power into heat, which tends to heat the components of the motor. Heat is generated both through Joule effect by the current in the windings, as well as through friction, for example in the bearings supporting the rotor.

Many electric motors are air-cooled through fans keyed on the rotor and generating an air flow through the casing. In some applications this is either impossible or insufficient.

Electric motors are also known, cooled by a liquid coolant, for example water.

US2016/0087509 discloses a structure for cooling the end parts of the stator windings of an electric motor. The cooling structure comprises a plurality of rings stacked over one another and housed in a cylindrical case defining an annular seat for the rings. The case, with the rings inserted therein, is installed on the stator of the electric motor, coaxially thereto, and so as to surround the portion of stator windings projecting from the ferromagnetic core of the stator.

US 2019/0173332 discloses a stator of an electric motor having a core formed by a plurality of laminations stacked over one another. The laminations are provided with openings forming channels for cooling the stator core.

A similar solution is disclosed in US2019/0157923.

These known structures provide for cooling the stator but not the whole motor, and are therefore not satisfactory.

In particular, electric motors for automotive have significantly high voltages and powers, and must be cooled by a liquid coolant in order to have high yields.

It would therefore be useful to produce electric motors having liquid cooling systems that are better than the existing ones as regards both heat removal efficiency and easiness in construction, for example of seals.

There is therefore the need to provide electric motors with cooling systems that are more efficient than, or in any case alternative to, air cooling systems.

SUMMARY OF THE INVENTION

According to an aspect, a casing is provided for an electric motor, including a circuit for a liquid coolant. The cooling circuit is built by stacking over one another rings produced from a sheet and joined together, for example through braze welding. The rings have slots that, when the rings are stacked over one another and joined together, define one or more cooling channels.

More specifically, in embodiments described herein, the casing includes a plurality of first rings aligned to one another along a longitudinal axis of the casing. The rings are joined together to form a central body of the casing, inside which the stator and the rotor of the electric motor are housed.

The cooled casing also has seats for bearings supporting the rotor. The seats can be made in a single piece with the casing and a lid thereof, or they can be installed on the casing. As will be clearly apparent from the description below, the bearing seats can, at least partially, be cooled through channels formed using a technique similar to that used for forming the cooling channels of the casing body.

In practice, each ring can be formed by cutting a flat sheet, and will have therefore parallel flat faces orthogonal to the axis of the casing. In practice, the rings can be stacked so that the parallel flat faces of each ring are in contact with corresponding parallel flat faces of adjacent rings of the stack, except the first ring and the last ring of the stack that forms the body of the casing, which have free surfaces, to which closing flanges or manifolds for the coolant are applied, as described below.

To form the cooling circuit, each ring comprises at least a first slot passing through the thickness of the respective ring and therefore extending from one face to the other of the ring. Each slot may advantageously have linear arched extension following the circumferential extension of the ring. Each slot may extend for an arc of only a few degrees or tens of degrees.

The slots of the various rings are preferably equal to one another.

The first rings forming the body of the casing are stacked over one another along the longitudinal axis of the casing, in such a way that the slots form a cooling channel extending along the longitudinal extension of the casing.

The cooling channel may be parallel to the axis of the casing. In this case, the rings are arranged in the same mutual angular position, so that all slots of a ring are perfectly aligned with the slots of the other rings.

However, to have a better heat exchange, the cooling channel has preferably a helical extension around the axis of the casing. To this end, each ring is offset relative to the adjacent rings by such an angle that the single slots follow one another along the longitudinal extension of the casing, gradually changing the angular position around the axis of the casing, moving from one end to the opposite end of the body formed by the rings, that is, from the inlet to the outlet of the cooling channel. In this way, slots of adjacent rings are mostly but not completely overlapping, so as to form a helical cooling channel.

In advantageous embodiments, each ring that forms the body of the casing has more than one slot, for example from two to six, or even more, slots. In this way, by stacking the rings, a number of cooling channels is formed equal to the number of slots provided on each ring.

The slots of a single ring may be arranged at constant pitch, but this is not mandatory. It is important that they are arranged in such a way that, by stacking the rings over one another, the aligned slots, even if with an angular offset between consecutive rings, form the respective cooling channels.

Even when more than one cooling channel is provided, the cooling channels may be parallel to the axis of the casing, and therefore to the axis of the motor, or extend helically. In practice, a cooling circuit is obtained that, in this case, extends like a multi-start threaded helix, each thread being formed by a cooling channel.

The number of slots, the length (i.e., the angular extension) and the width thereof may be chosen based on the pressure drop expected along the cooling circuit and therefore according to the desired heat exchange. The pressure drop and the amount of heat that can be removed may also vary depending on the inclination of the cooling channel relative to the axis of the casing.

The rings forming the body of the casing may be joined together using any technique suitable to give the body the required mechanical strength. Moreover, the rings are joined together so as to ensure leak-tightness against the fluid, particularly the liquid, flowing in the cooling channel(s) formed in the casing. In particularly advantageous embodiments, the rings are joined together through braze welding, for example in a high vacuum furnace.

What is important is that the technique used for joining the rings prevents the coolant from coming into direct contact with the parts forming the electric motor (in particular, the stator and the rotor). Braze welding, or other equivalent technique, allows forming a single piece, wherein the leak-tightness is ensured without the use of gaskets that could result in leakages, so as to minimize the number of seals required. Seals can be used, for example, only in the interface between the body of the casing and the closing flanges.

By minimizing the seals and having a single piece, it is possible to have higher operative temperatures than in other fluid-cooling systems; in this way, the motor using the casing of the invention is also adapted to operate in environments which are particularly exposed to heat or, in any case, to operate at high temperatures without risks.

In some embodiments, each ring is obtained by cutting a sheet, for example through water-jet cutting or shearing, or in any other suitable way. The sheet may have a central layer made of a metal alloy, for example an aluminum alloy, on the outer faces of which a plating is applied made of an alloy having a lower melting temperature than that of the alloy forming the central layer. Once stacked over one another in the correct angular position, the rings are then put into a high vacuum furnace and brought to such a temperature as to melt the plating under vacuum, this resulting, after the rings have been cooled, in the permanent joining of the stacked rings, thus forming a monolithic structure.

Alternatively, the rings may have a plating on only one face.

If the casing has more than one cooling channel, it is advantageous to provide only a single inlet connection and a single outlet connection for the coolant.

To this end, it is advantageous to provide an inlet manifold for the coolant, fluidly connecting the outlet ends of the various cooling channels to one another and to the inlet connection. In advantageous embodiments, an outlet manifold for the coolant is also provided, fluidly connecting the outlet ends of the cooling channels to one another and to the outlet connection.

This configuration is particularly advantageous, because it allows having a single inlet connection and a single outlet connection, thus simplifying the external circuit supplying the coolant. However, it is also possible to omit the inlet manifold or the outlet manifold, and to provide a plurality of inlet connections and/or a plurality of outlet connections.

The inlet manifold, if any, may comprise an approximately annular chamber fluidly connected to the various cooling channels and to the inlet connection. Similarly, the outlet manifold, if any, may include an approximately annular chamber fluidly connected to the cooling channels and to the outlet connection.

The inlet manifold and the outlet manifold may be joined to the central body of the casing in various ways. In some preferred embodiments, the manifolds are joined to the central body of the casing by braze welding.

Any one or both the inlet manifold and outlet manifold may be made in a single piece, for example through chip removal machining from a block of sufficient thickness, with a closing flange.

In preferred embodiments, also the inlet manifold and the outlet manifold are formed by a respective group of rings cut from a sheet and joined together, for example through braze welding. Some rings forming the inlet manifold and the outlet manifold may have openings or slots passing through the thickness of the rings, so as to form a chamber, for example an annular chamber, which fluidly connects the cooling channels to one another and to an inlet connection or an outlet connection for the coolant. One or more end rings may close the chamber of the manifold.

If the inlet and/or outlet manifolds are formed by means of shaped rings, with a technique similar to that used for the body of the casing, it is possible to stack, in the correct mutual angular position, all rings forming both the manifolds and the central body of the casing, and then to join the rings together though high-vacuum braze welding. To this end, all rings forming the casing with the respective inlet manifold and outlet manifold have a brazing plating on at least one face.

Alternatively, the rings may be manufactured by cutting sheets without plating, and interposing sheets of braze-welding material between the rings. In this case the manufacturing process is however more complex.

In advantageous embodiments, closing flanges are applied to the ends of the casing, respectively a front and a rear closing flange, at least one of which has a through hole for the output shaft of the motor. In the case of a double output shaft projecting from the two ends of the casing, both end flanges may have openings therefor. A seat may be associated to each flange for a respective support bearing.

In advantageous embodiments, any one or both seats for the bearing supporting the rotor are formed using a technique similar to that used for the body of the casing and, if necessary, for the inlet manifold and the outlet manifold. In this case, laminar elements forming the front flange and/or the rear flange define, through slots passing through the thickness thereof, an extension of the cooling circuit, which cools the seat for the respective support bearing.

Each laminar element forming the seat(s) for the support bearings may have an inner annular portion, which forms the actual seat, and a perimeter annular portion, aligned, along the longitudinal axis of the casing, with the first rings forming the body of the casing. At least one radial element joins the perimeter annular portion and the central annular portion together. Suitably shaped slots or openings, passing through the thickness of the laminar elements, form (when the laminar elements are joined to one another and to the other components of the casing) a circuit for the coolant to circulate, fluidly connected to the inlet connection and the outlet connection and to the cooling channels formed in the body of the casing.

Further advantageous features and embodiments of the casing are described below and in the attached claims, forming an integral part of the present description.

The invention also relates to an electric motor with a casing as defined above, a stator housed in the casing and a rotor supported pivotable in the casing.

A further object of the invention is a method for producing a casing for an electric motor. According to embodiments described herein, the method comprises the following steps:

- stacking a plurality of first rings over one another along a common longitudinal axis defining the axis of the casing; wherein each first ring comprises at least a first slot passing through the thickness of the respective ring; and wherein the rings are so angularly positioned with respect to one another that the first slots of the first rings form a first cooling channel extending along the longitudinal axis;
- joining the first rings together, preferably through braze welding, thus forming a central body of the casing.

Further features and embodiments of the method according to the invention are described below and defined in the attached claims.

BRIEF DESCRIPTION OF THE DRAWING

The invention will be better understood by following the description below and the attached drawing, showing non-limiting embodiments of the invention. More specifically, in the drawing:

FIGS. 11A, 11B, 11C, 11D, 11E, 11F, 11G, 11H 11I and 11J are front views showing details of the components of the casing of FIGS. 7 to 11;

DETAILED DESCRIPTION

Embodiment of FIGS. 1 to 6

Figure 1:
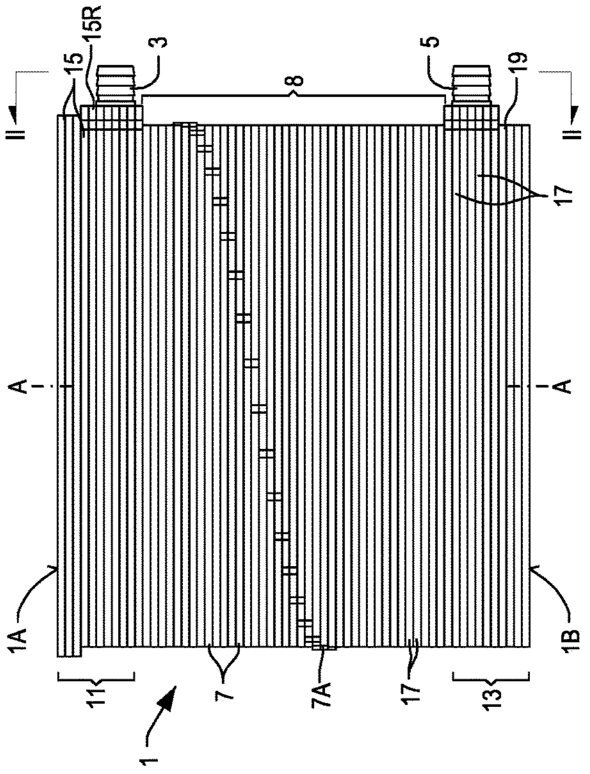
FIG. 1 is a side view of a casing according to the invention in a first embodiment.
Figure 2:
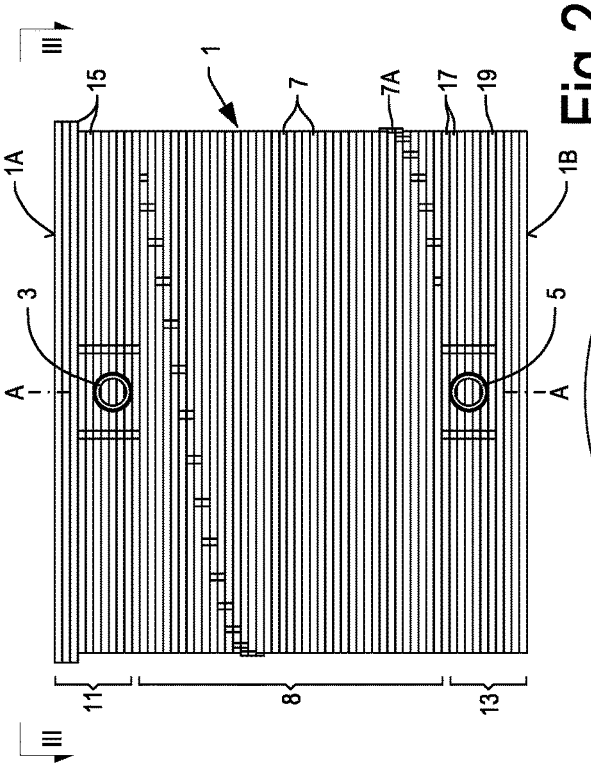
FIG. 2 is a side view according to II-II in FIG. 1.
Figure 3:
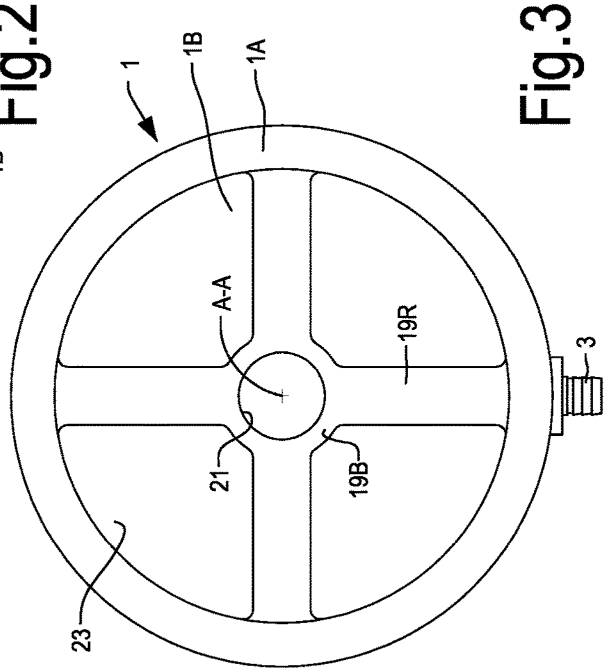
FIG. 3 is a view according to III-III in FIG. 2.
Figure 4:
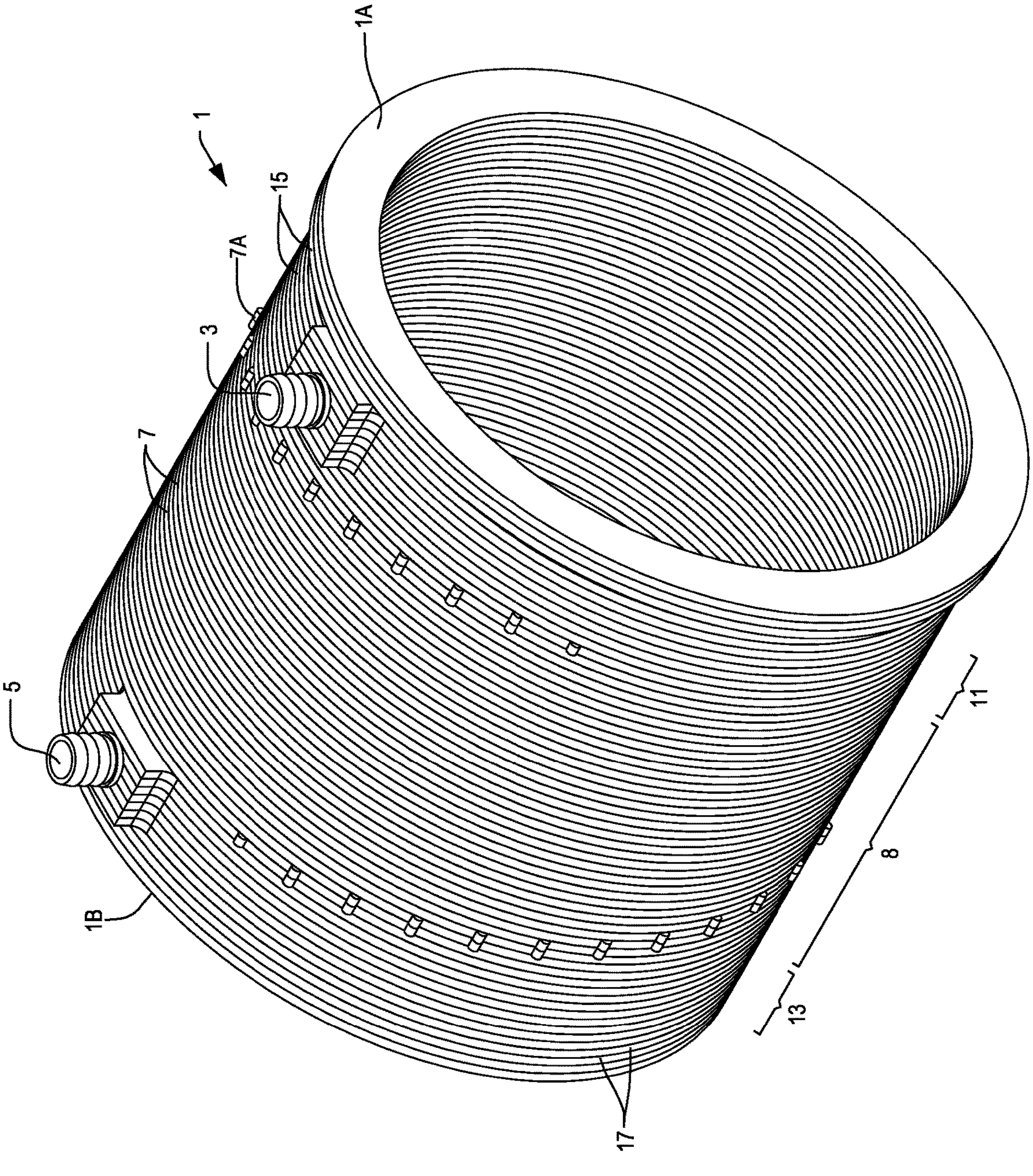
FIG. 4 is an axonometric view of the casing of FIGS. 1 to 3.

FIGS. 1 to 6 show a first embodiment of the casing for an electric motor according to the invention. FIGS. 5A-5G are front views of individual components thereof.

The casing 1 includes a front part 1A and a rear part 1B. The front part must be closed by a flange, not shown, which has an opening for the output shaft housed in the inner space of the casing 1.

A cooling circuit, described below, is provided inside the approximately cylindrical wall of the casing 1, the circuit being connected to coolant supplying means through an inlet connection 3 and an outlet connection 5. The position of the connections 3, 5 may be reversed with respect to that shown.

The main body 8 of the casing 1 is formed by a plurality of first rings 7. Each ring 7 can be produced from a sheet, for example through water-jet cutting or shearing, or using any other suitable technique. A single ring 7 is shown in detail in FIG. 5E.

The sheet may be made of a metal alloy, for example an aluminum alloy, and may have, on one on both the two parallel flat faces delimiting it, a brazing plating. The plating is made of a metal alloy having a melting temperature lower than the melting temperature of the alloy forming the rest of the sheet. The rings, once having been suitably stacked over one another in the correct mutual angular position, are then heated in a high-vacuum furnace until the melting temperature of the plating is achieved, and are subsequently cooled to obtain, after plating solidification, a monolithic structure.

As will be described in detail below, inlet and outlet manifolds are associated to the central body, which can be built in various ways and can also be joined to the central body through braze welding or other coupling systems, for example screws, depending on the technique used to build them.

To provide the cooling circuit inside the approximately cylindrical wall of the casing 1, each ring 7 comprises at least one slot 9 passing through the entire thickness of the sheet forming the ring 7. The slots 9 are shown in particular in the exploded view of FIG. 5 and in the detail of FIG. 5E. As shown in FIG. 5E, each ring preferably comprises more than one slot 9, for the purposes described below. In the illustrated example, six slots 9 are provided. Each slot 9 preferably has a shape elongated according to an arc of circumference.

Figure 5:
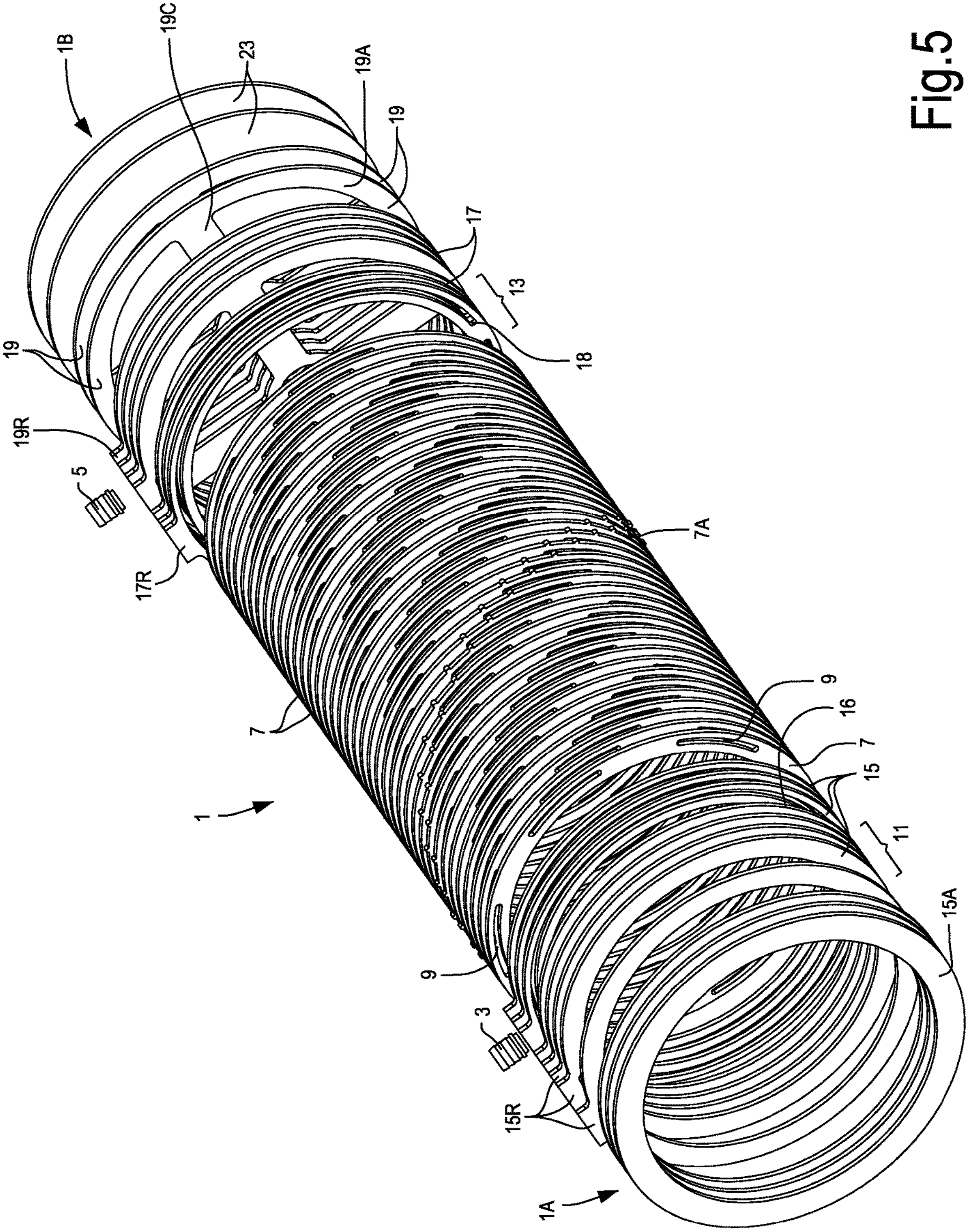
FIG. 5 is an exploded view of the rings forming the casing of FIGS. 1 to 4.
Figure 5A:
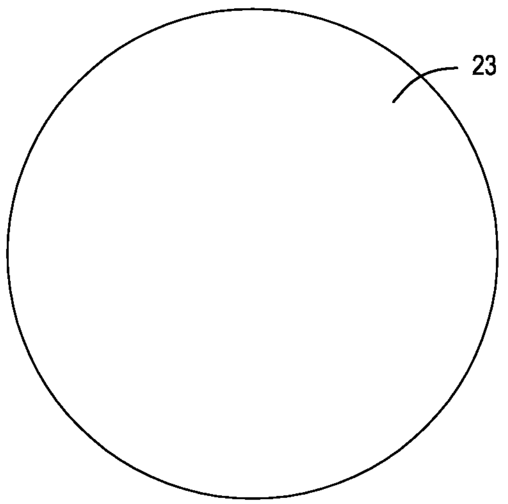
FIGS. 5A, 5B, 5C, 5D, 5E, 5F, 5G and 5H are front views showing details of the individual components of the casing of FIGS. 1 to 5.
Figure 5B:
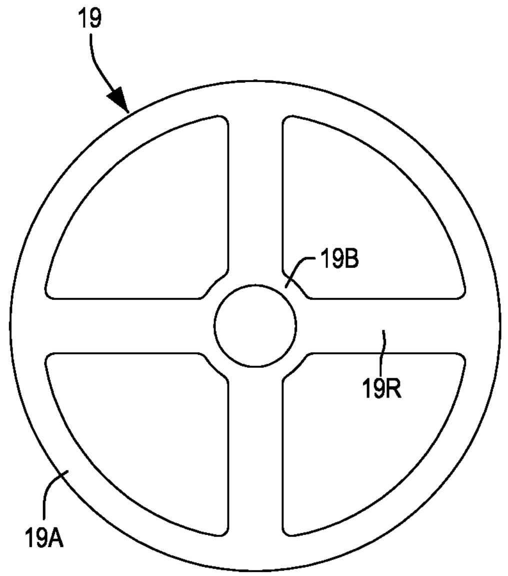

As clearly shown in FIG. 5, the rings 7 are stacked over one another along the axis A-A of the casing 1 in such a way that the slots 9 of a ring 7 are slightly angularly offset with respect to the slots of the adjacent ring. The angular offset is such that, by stacking the rings 7 over one another, the slots jointly form a plurality of cooling channels, whose number is equal to the number of slots provided on each ring 7. Each cooling channel extends helically along the axis A-A of the casing 1. In practice, the cooling channels form a multi-start threaded helical structure.

This configuration is particularly advantageous, as it allows to obtain an optimal distribution of the coolant circulating in the cooling channels. However, in currently less preferred embodiments, the cooling channels may be straight and parallel to the axis A-A of the casing 1. In this case, the rings 7 are so angularly positioned relative to one another that each slot 9 is in the same angular position as the respective slot 9 of the adjacent rings.

In advantageous embodiments, the casing 1 comprises, in addition to the central body 8 formed by the rings 7, an inlet manifold 11 and an outlet manifold 13 for the coolant. The inlet manifold 11 is fluidly connected to the inlet connection 3, and the outlet manifold 13 is fluidly connected to the outlet connection 5. The position of the inlet manifold and the outlet manifold can be reversed with respect to that indicated in the figure, that is, the manifold 11 can be an outlet manifold, and the manifold 13 can be an inlet manifold.

In some embodiments, any manifold or both the inlet manifold and outlet manifold 11, 13 are formed by a plurality of rings joined together through braze welding.

In the embodiment illustrated in FIGS. 1 to 5, a plurality of second rings 15 forms the inlet manifold 11. The shape of each second ring 15 is shown in particular in FIG. 5D, where a ring is illustrated in isolation. The second rings 15 may be made from the same sheet of the first rings 7 and may be joined to one another and to the body 8 of the casing 1 through braze welding. At least some of the rings 15 have approximately annular openings 16, passing through the thickness of the rings 15, so that several rings 15 stacked over one another form an annular chamber fluidly connecting with one another the inlet ends of the cooling channels formed by the slots 9. The annular openings 16 have an extension of less than 360°, so as to keep the inner portion and the outer portion of each ring 15 connected to each other.

The annular chamber formed by the annular openings 16 is closed at the front by one or more rings 15A that are devoid of annular opening 16. In the illustrated example, several rings 15A are provided of slightly different shapes, as shown in FIGS. 5F, 5G, 5H.

At least some of the rings 15, 15A have radial appendices 15R. Once the rings 15, 15A have been joined to one another and to the rings 7, for example through braze welding, the radial appendices 15R form shanks, in which a radial hole may be formed for coupling the inlet connection 3.

Figure 5D:
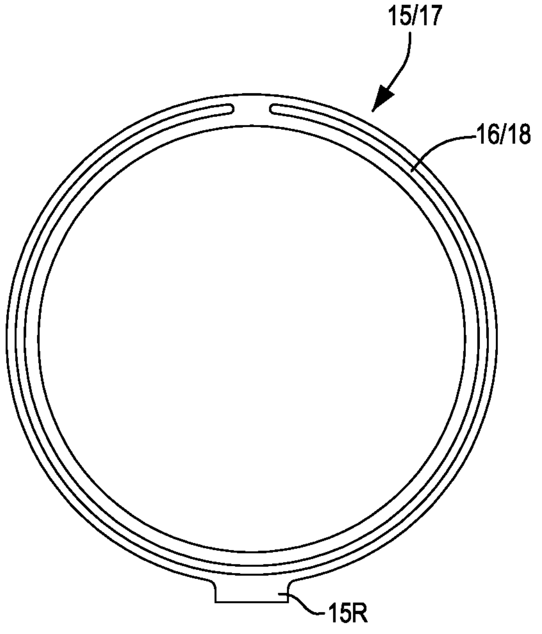
Figure 5C:
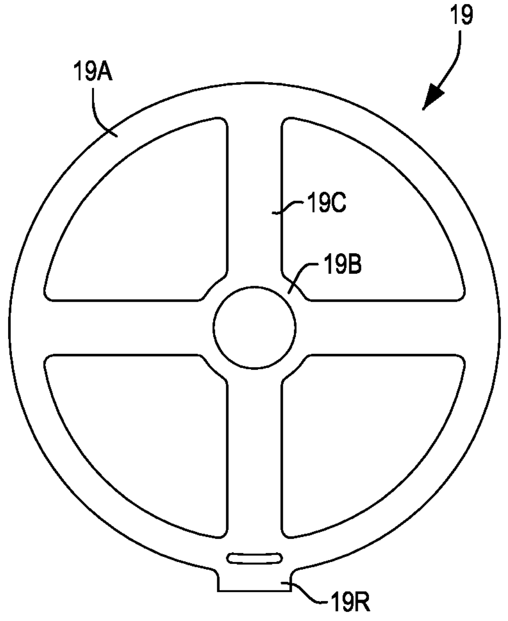
Figure 5F:
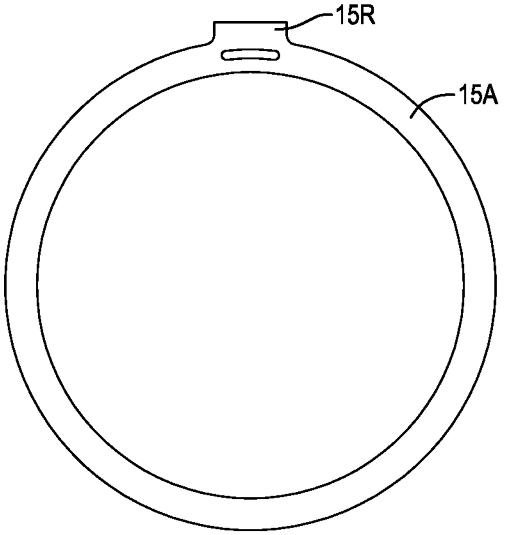
Figure 5E:
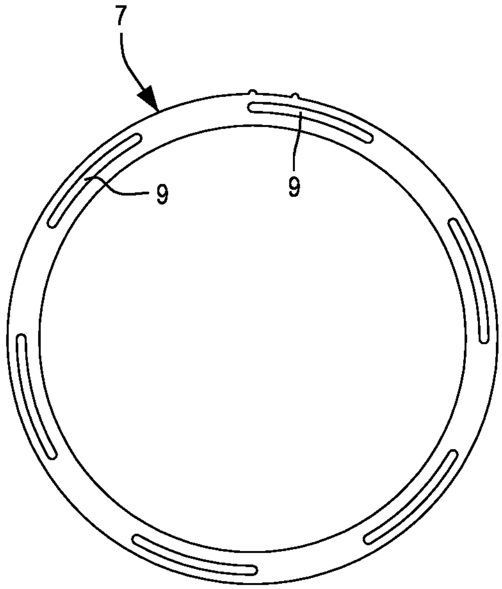
Figure 5H:
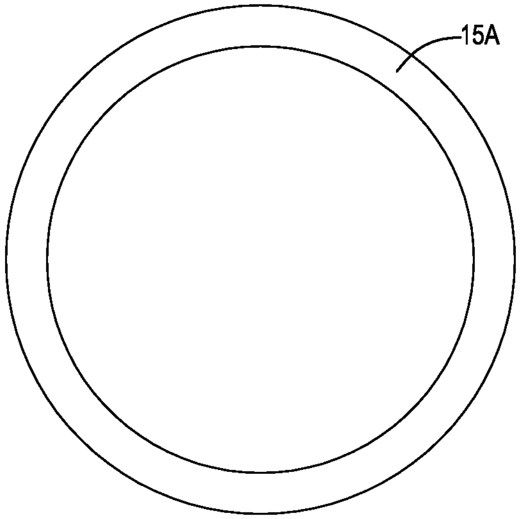
Figure 5G:
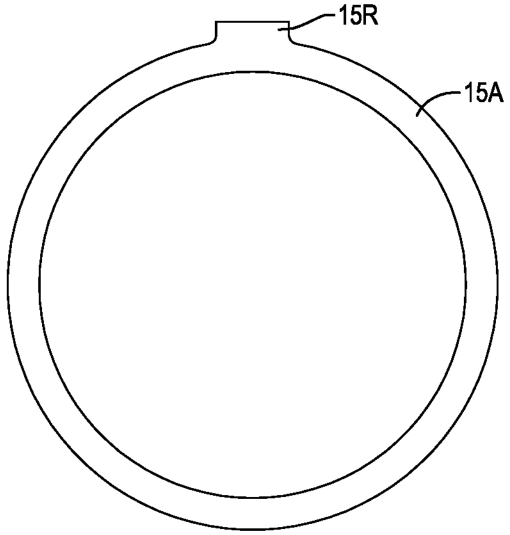

In the embodiment shown in FIGS. 1 to 6, the outlet manifold 13 is formed, similarly to the inlet manifold 11, by a plurality of third rings 17, made similarly to the rings 15 and therefore having the shape illustrated in FIG. 5D. More specifically, the third rings 17 are made from the same sheet from which the first rings 7 and the second rings 15 are obtained, and are connected to one another and to the body 8 of the casing 1 by brazing. Some of the rings 17 have approximately annular openings 18 passing through the thickness of the rings 17, so as to form an annular chamber fluidly connecting to one another the outlet ends of the cooling channels formed by the slots 9. The annular openings 18 have an extension of less than 360°, so as to keep the inner portion and the outer portion of each ring 17 connected to each other.

At least some of the rings 17 have radial appendices 17R. Once the rings 17 have been joined to one another and to the rings 7 forming the central body 8 of the casing 1, the radial appendices 17R form shanks, in which a radial hole may be formed for coupling the outlet connection 5.

Adjacent to the third rings 17, a series of laminar elements 19 is provided, forming a seat 21 for a rear bearing (not shown) supporting the rotor of the electric motor. As shown in particular in FIGS. 3 and 5, as well as in FIGS. 5B and 5C, each laminar element 19 has a perimeter annular portion 19A aligned, along the longitudinal axis A-A of the casing 1, with the first rings 7, the second rings 15, and the third rings 17. The perimeter annular portion 19A is joined to a central annular portion 19B through radial elements 19C. The various central annular portions 19B (see in particular FIG. 3) of the laminar elements 19 form the seat 21 (FIG. 3) for the rear bearing (not shown) supporting the rotor of the electric motor. The laminar elements 19 are made from the same sheet forming the rings 7, the rings 15, 15A and the rings 17, and are joined to one another and to the last of the rings 17 by braze welding. Some of the laminar elements 19 (see FIG. 5C) have radial appendices 19R analogous to the appendices 17R of the rings 17, for the same purposes.

Advantageously, the rear portion of the casing 1 can be provided with, and sealed by, a flange formed by a plurality of laminar elements 23 (see also FIG. 5A) in the form of solid discs made from the same sheet forming the rings 7, 15, 17.

Briefly, the casing 1 is formed by stacking over one another, in sequence: the discs 23, the laminar elements 19, the rings 17, the rings 7, the rings 15 and the rings 15A. Once these components have been stacked over one another in the correct mutual angular position, they are brazed in a high-vacuum furnace, where the temperature reaches such a value as to melt the plating of the sheet from which the components 23, 19, 17, 7, 15, 15A have been made. The cooling and solidification of the low melting alloy forming the plating transform the series of laminar elements and rings into a single piece.

After having formed radial holes, if necessary threaded holes, in the shanks formed by the appendices 15R and 17R, the inlet manifold 3 and the outlet manifold 5 are then fastened to the single piece.

Figure 6:
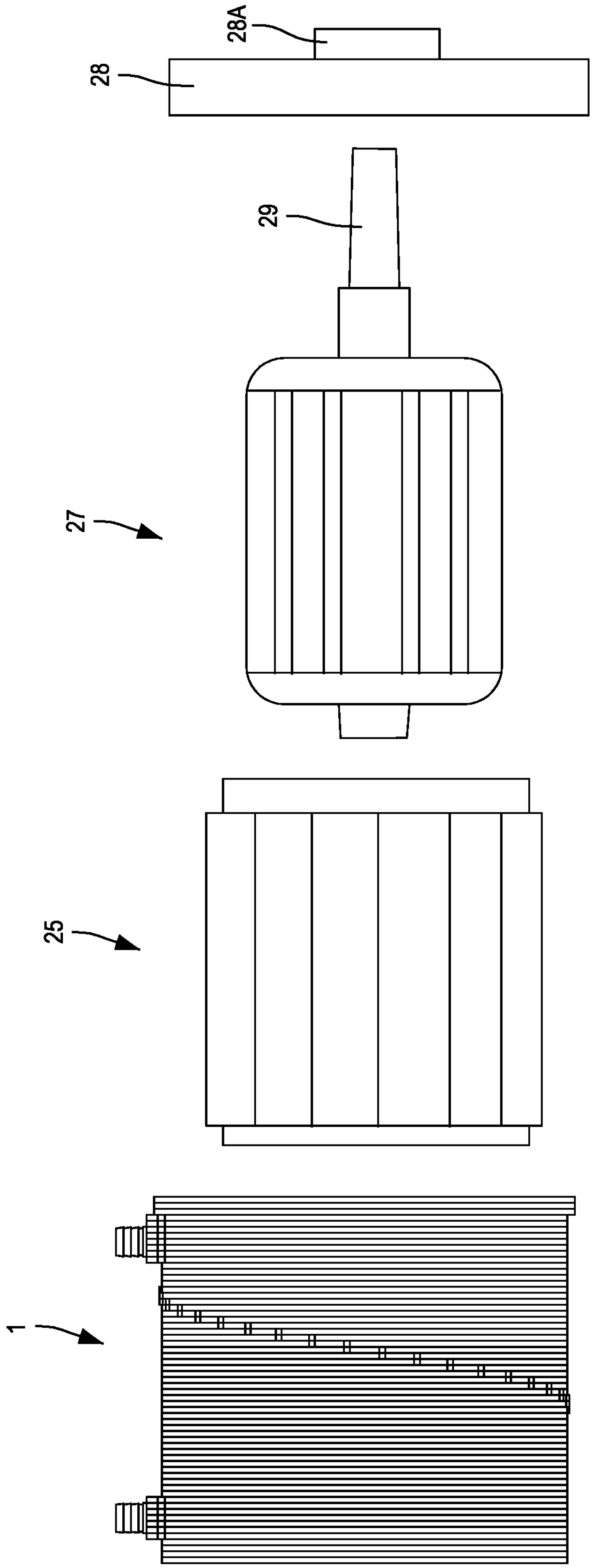
FIG. 6 is a schematic side view of the casing, the stator and the rotor of an electric motor.
Figure 7:
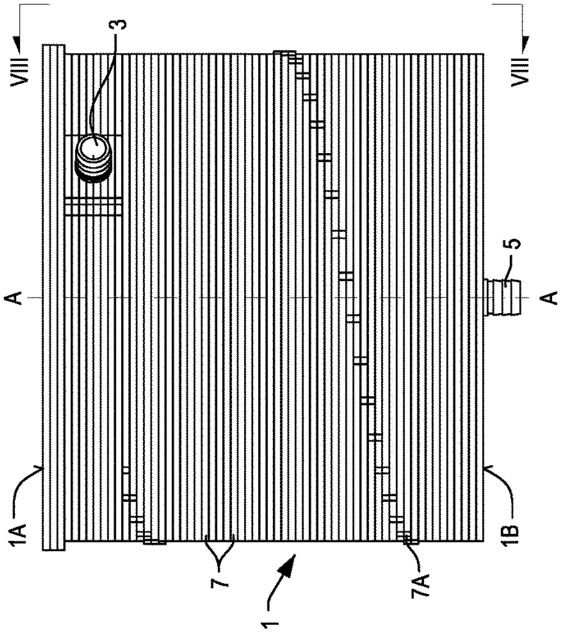
FIG. 7 is a side view of a casing according to the invention in a further embodiment.
Figure 8:
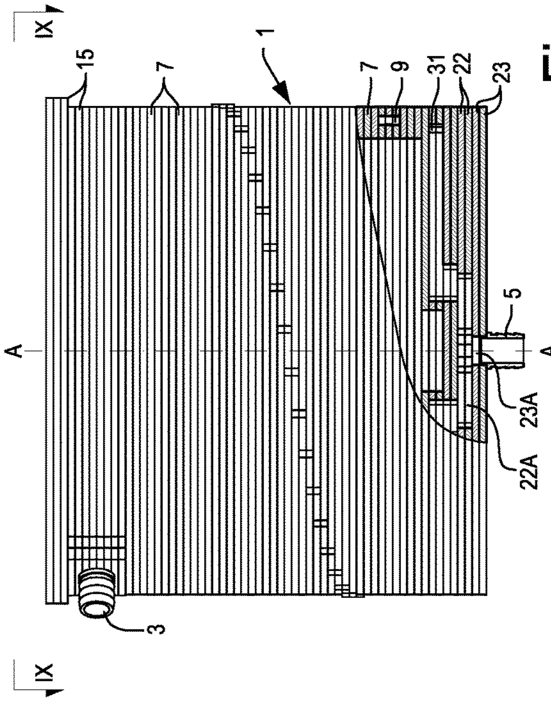
FIG. 8 is a partially cut-away side view according to VIII-VIII in FIG. 7.
Figure 9:
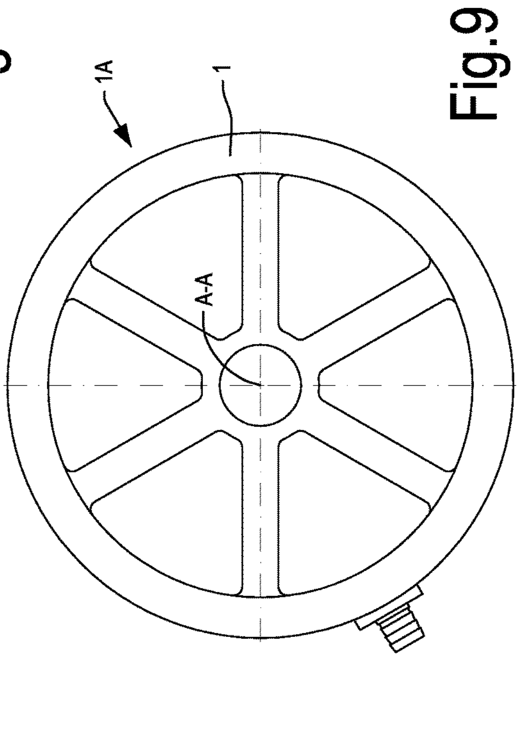
FIG. 9 is a view according to IX-IX in FIG. 8.
Figure 10:
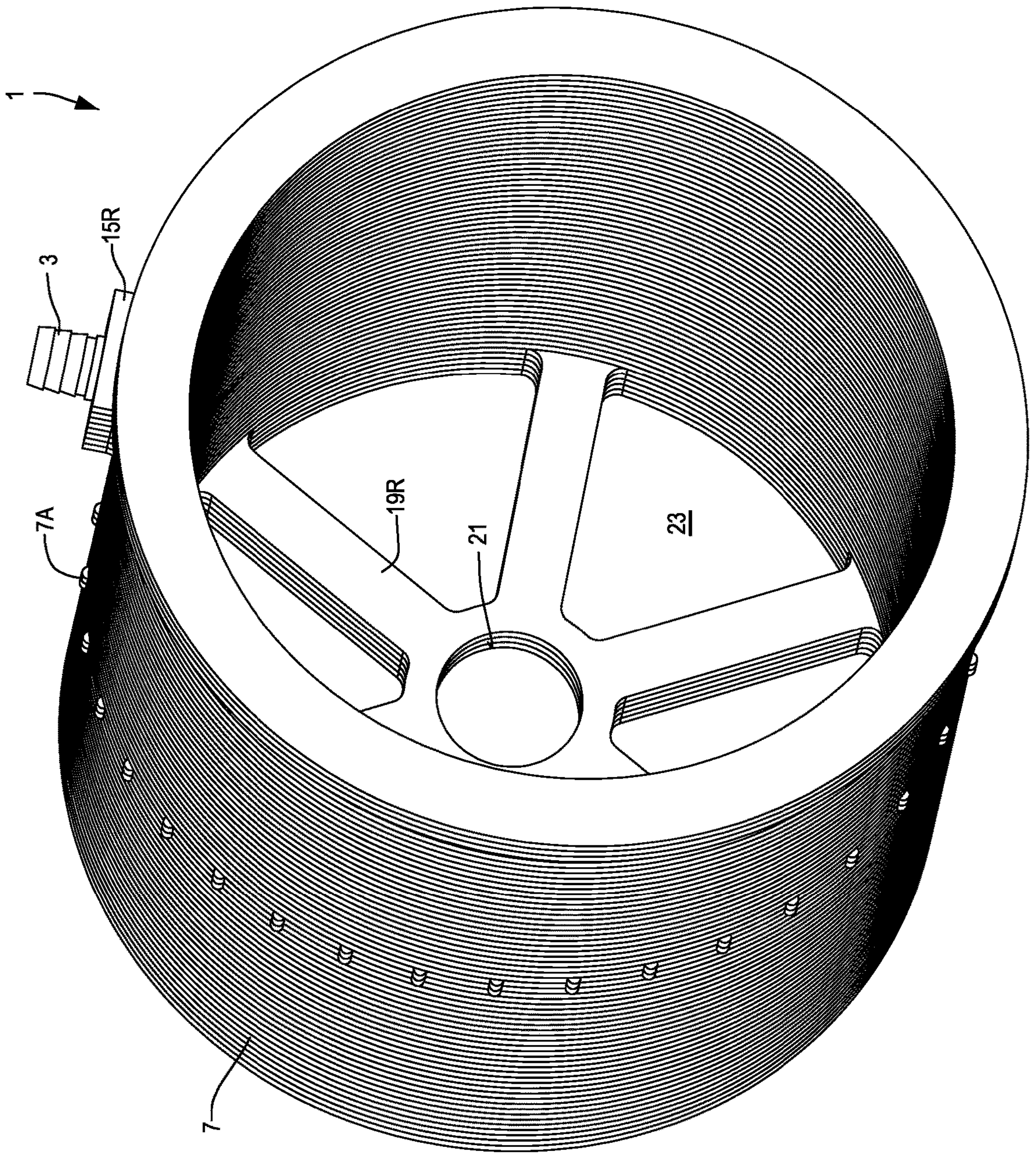
FIG. 10 is an axonometric view of the casing of FIGS. 7 to 9.

FIG. 6 schematically shows an exploded view of an electric motor comprising the casing 1, a stator 25, a rotor 27 and a front closing flange 28. The front flange 28 has a seat 28A for the front bearing supporting the shaft of the rotor, and a through hole (not shown) for the output shaft of the motor, schematically indicated with 29.

The front flange 28 may be fastened by means of screws engaging threaded blind holes, not shown, provided in the rings 15A. The front flange 28 may be provided with a circuit for cooling the seat for the support bearing, fluidly connected to the connection 3. In other embodiments, the front flange 28 has a circuit for cooling the seat 28A of the front bearing that is autonomous and separate from the cooling circuit of the casing, thus avoiding the need for seals between the front flange 28 and the casing 1.

The casing 1 of the motor may be equipped with a rest base, formed by suitably shaping the laminar elements and the rings forming the casing 1.

Embodiment of FIGS. 7 to 11

The technique for producing the casing 1 comprising a cooling circuit can be improved so as to form also a circuit for cooling one or both the seats for the bearings supporting the rotor 27.

FIGS. 7 to 11 show an embodiment wherein the seat 21 for the rear bearing is cooled. In FIGS. 7 to 11, the same reference numbers indicate the same or equivalent parts to those described with reference to FIGS. 1 and 5, that therefore will be not described again. A technique similar to that described below may be also used to provide a cooled seat for the front bearing.

Figure 11:
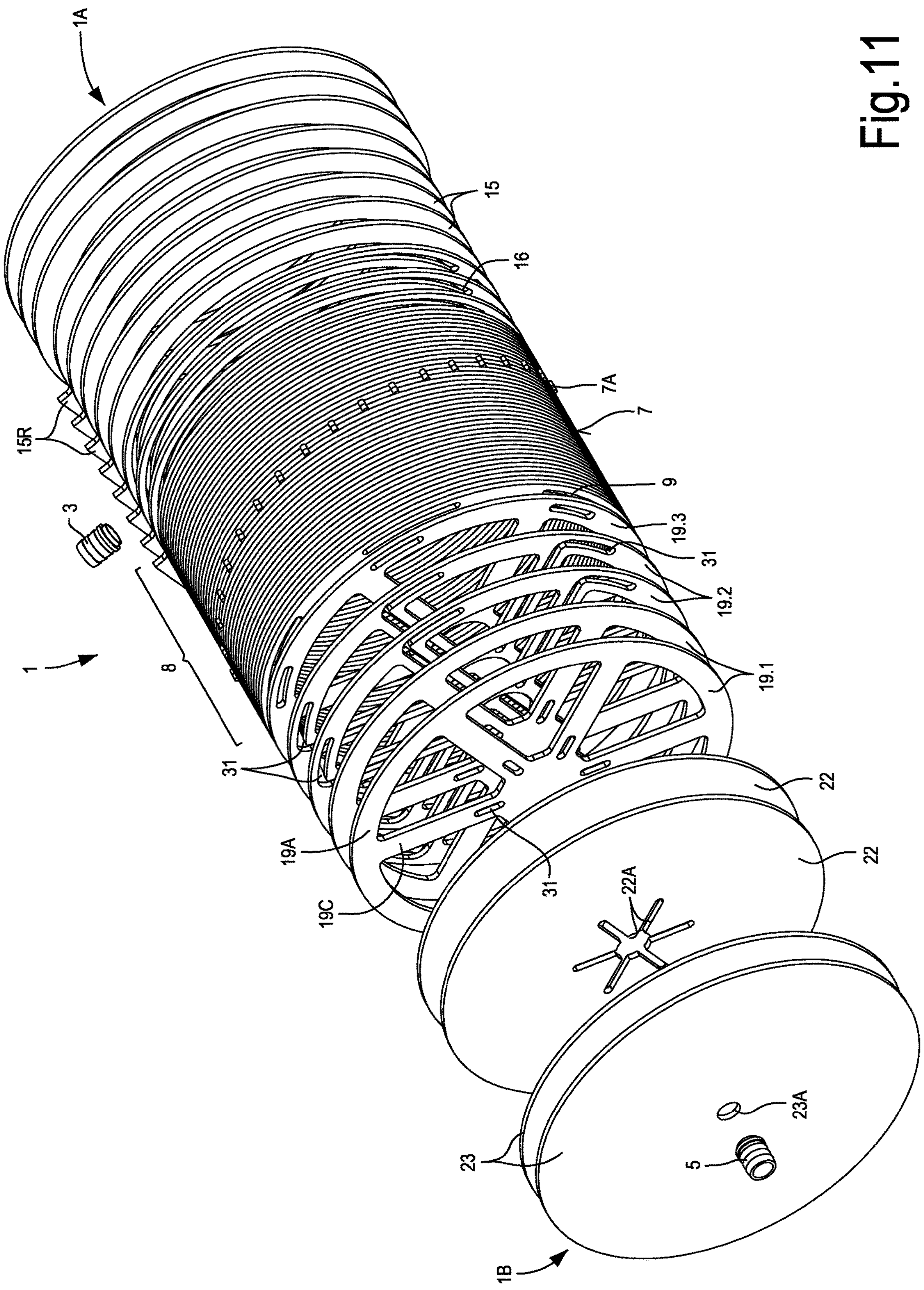
FIG. 11 is an exploded view of the rings forming the casing of FIGS. 7 to 10.
Figure 11A:
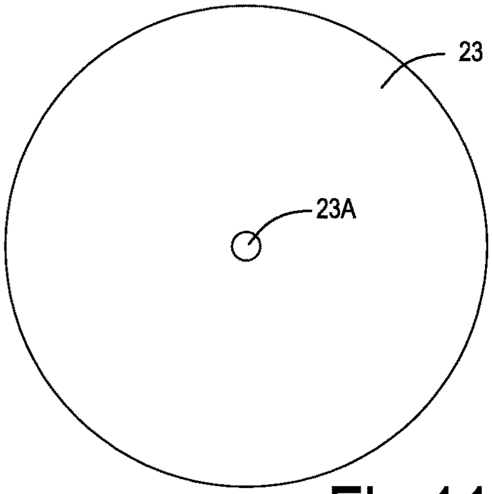
Figure 11B:
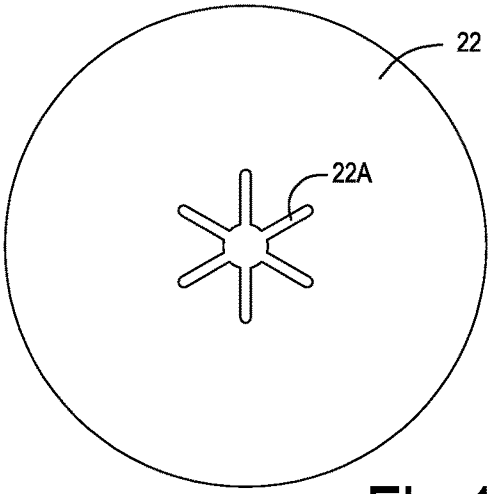
Figure 11C:
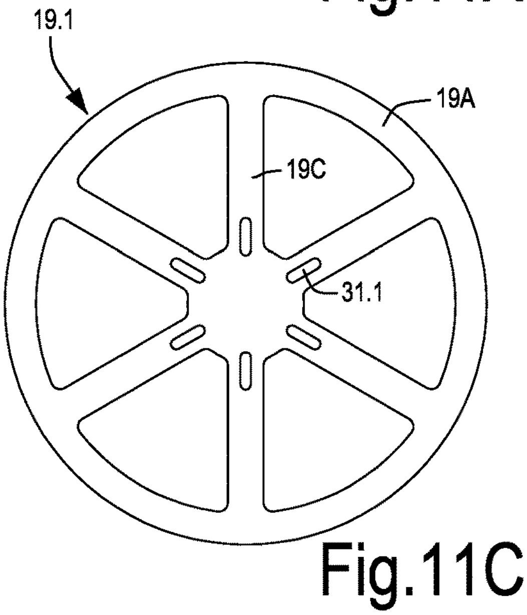
Figure 11D:
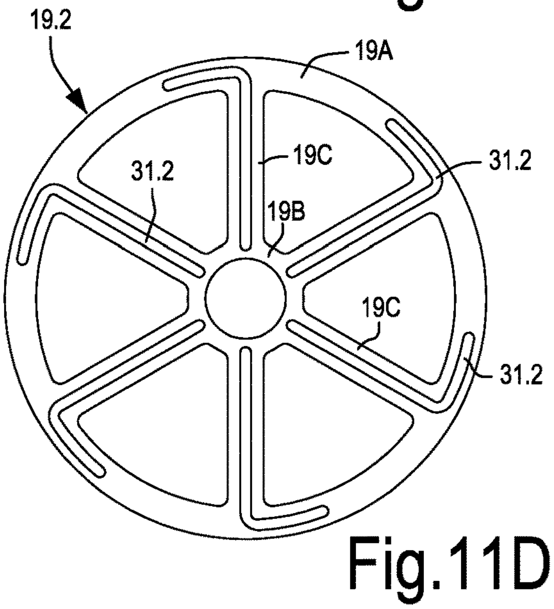
Figure 11E:
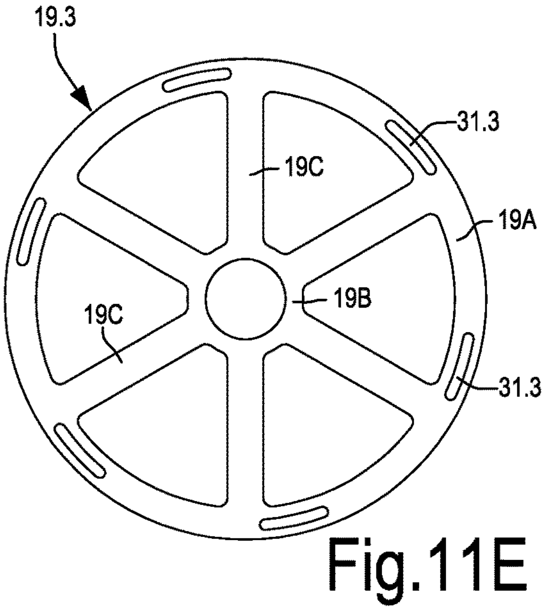
Figure 11F:
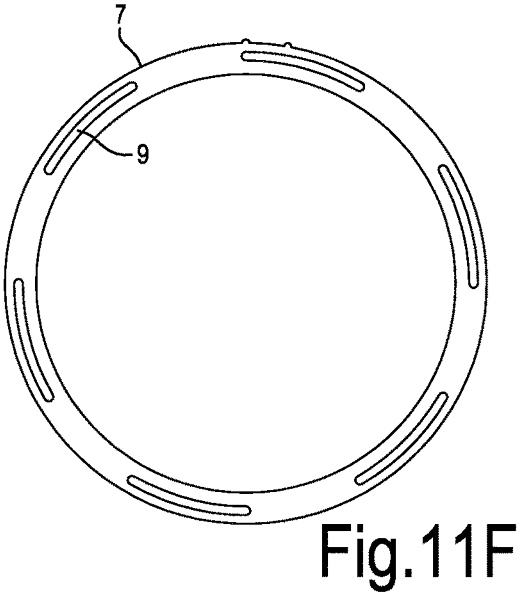
Figure 13:
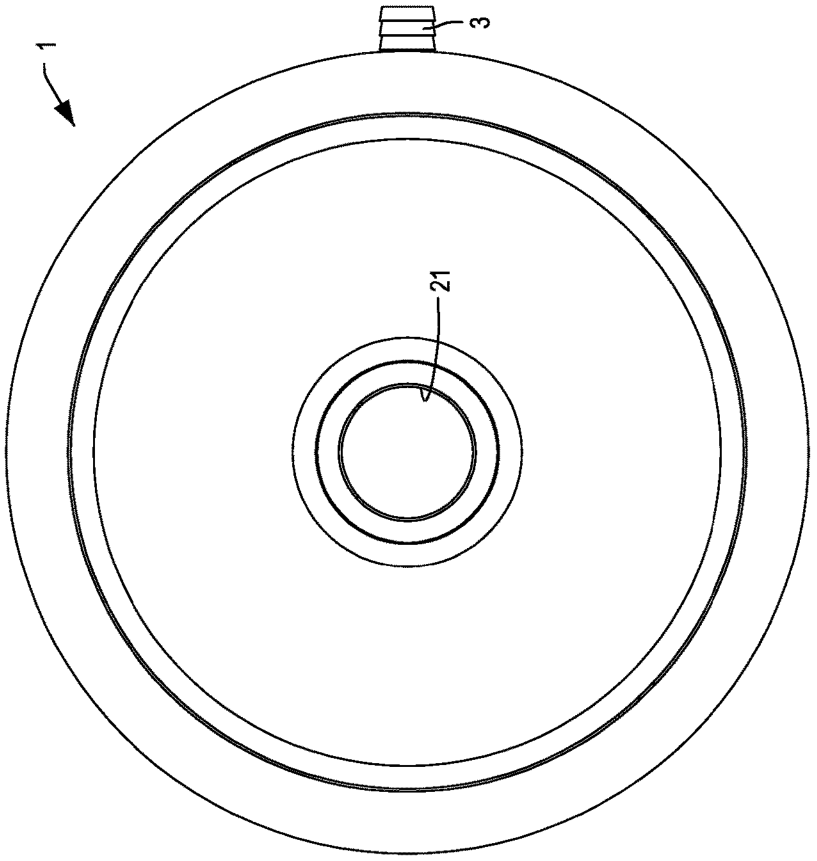
FIG. 13 is a view according to XIII-XIII in FIG. 12.
Figure 12:
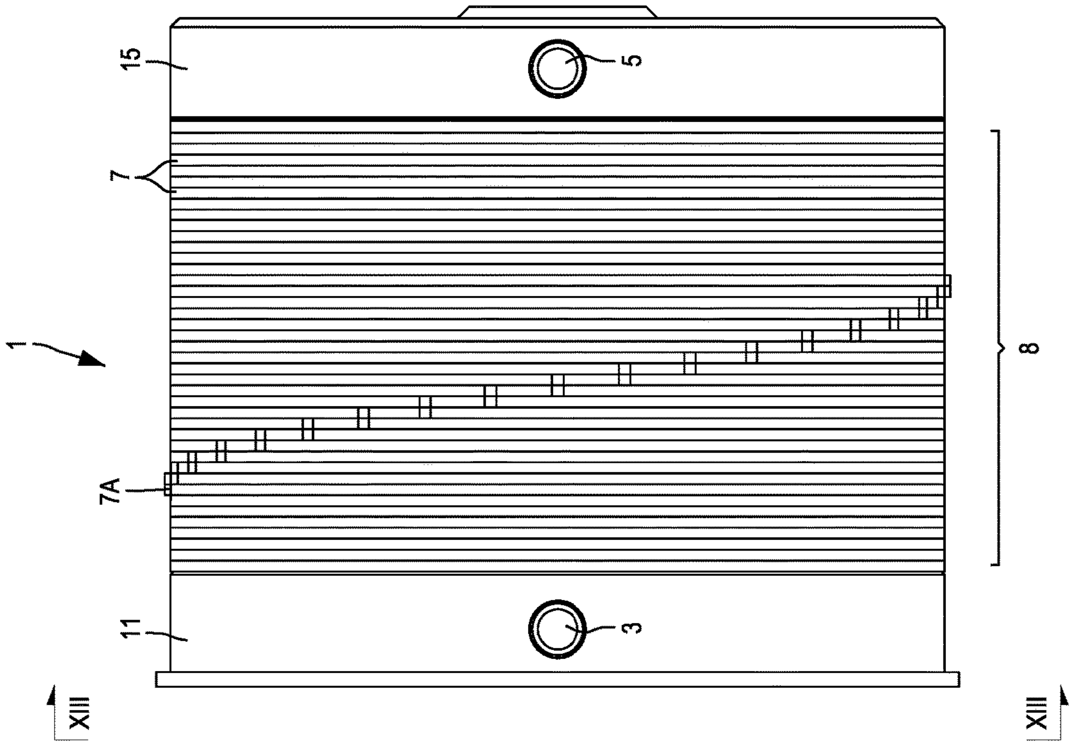
FIG. 12 is a side view of a casing in a further embodiment.
Figure 14:
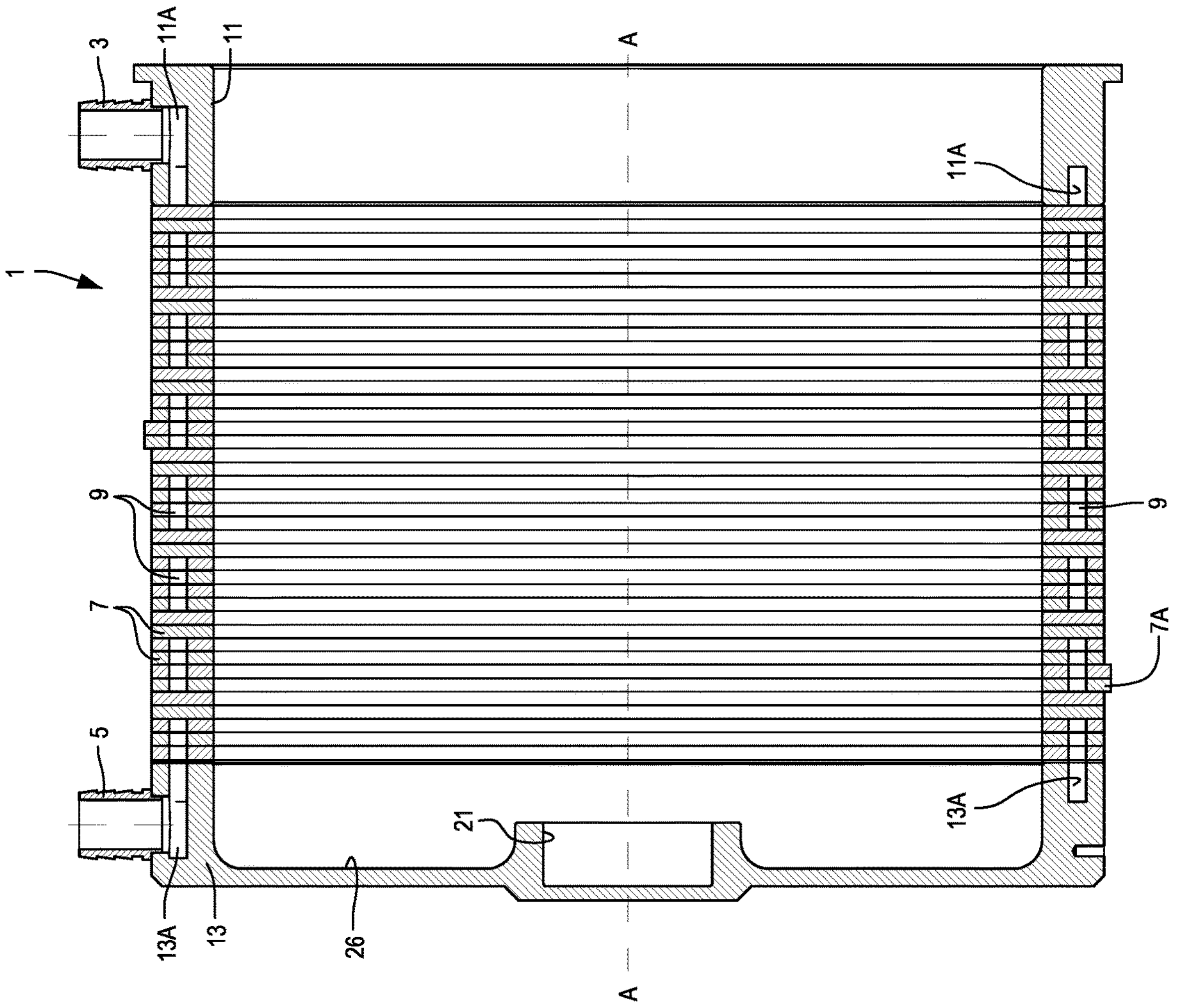
FIG. 14 is a cross-section of the casing of FIGS. 11 to 13, according to a plane containing the axis of the casing.

The main difference between the embodiment of FIGS. 1 to 5 and the embodiment of FIGS. 7 to 11 is that the rings 17 are omitted and the laminar elements forming the seat 21 for the rear bearing are of three distinct types, indicated with the reference numbers 19.1, 19.2, 19.3, shown in particular in FIGS. 11C, 11D, and 11E. Each laminar element 19.1, 19.2, 19.3 has through slots or openings, indicated with the reference numbers 31.1, 31.2 and 31.3, passing through the thickness thereof.

The slots 31.1, 31.2, 31.3 are so shaped as to define a plurality of channels which, extending radially, join the end of each cooling channel formed by the slots 9 to an axial passage formed by openings 22A provided in discs 22 (see FIG. 11, 11B). Once the casing 1 has been assembled, the set of the central parts of the single laminar elements 19.1, 19.2 and 19.3 form the seat 21 for the rear bearing. The discs 22 and additional rear discs 23 close the casing 1 at the back. The discs 23 have a central hole 23A coaxial with the openings 22A of the laminar elements 22.

The discs 22, 23 and the laminar elements 19.1, 19.2, 19.3 are made, for example, from the same sheet used for the rings 7 and 15, and can be joined to one another and to the main body 8 of the casing 1 by braze welding. The outlet connection 5 is applied in the axial passage formed by the holes 23A of the discs 23 joined together.

In practice, in this embodiment, the outlet manifold is formed by the openings or slots 31.1, 31.2, 31.3 and the openings or passages 22A formed in the discs 22. These openings fluidly connect the outlet connection 5 and the individual cooling channels formed by the slots 9. The coolant flows from the channels formed by the slots 9 through radial passages provided in the radial elements 19C and through channels formed by the opening 31.1, thus cooling the hollow cylindrical body formed by stacking over one another the central annular portions 19B defining the seat 21 for the rear bearing. As shown in particular in FIGS. 11, 11A-11E, the openings provided in the laminar elements 19.1, 19.2, 19.3 and in the discs 22 and 23 are such as to prevent the coolant from entering the inner space of the seat 21, where the rear bearing is installed.

Although reference has been made in the above description to an outlet connection 5 fluidly connected directly to the seat 21 for the rear bearing, it shall be understood that the position of the inlet connection 3 and the outlet connection 5 may be reversed and, in that case, the inlet connection is fastened to the discs 22, 23 and the direction of circulation of the coolant is reversed.

The inlet manifold 11 is formed by rings 15, 15A, shown in detail in FIGS. 11G-11J, that are substantially equal to the rings 15, 15A described with reference to FIGS. 1 to 5.

Embodiment of FIGS. 12 to 15

A further embodiment is illustrated in FIGS. 12 to 15. The same numbers indicate the same or equivalent parts to those described above, which will be not described again.

The main difference between the previous embodiments and the embodiment of FIGS. 12 to 15 is the construction of the inlet manifold and the outlet manifold, indicated again with the reference numbers 11 and 13 respectively.

Figure 15:
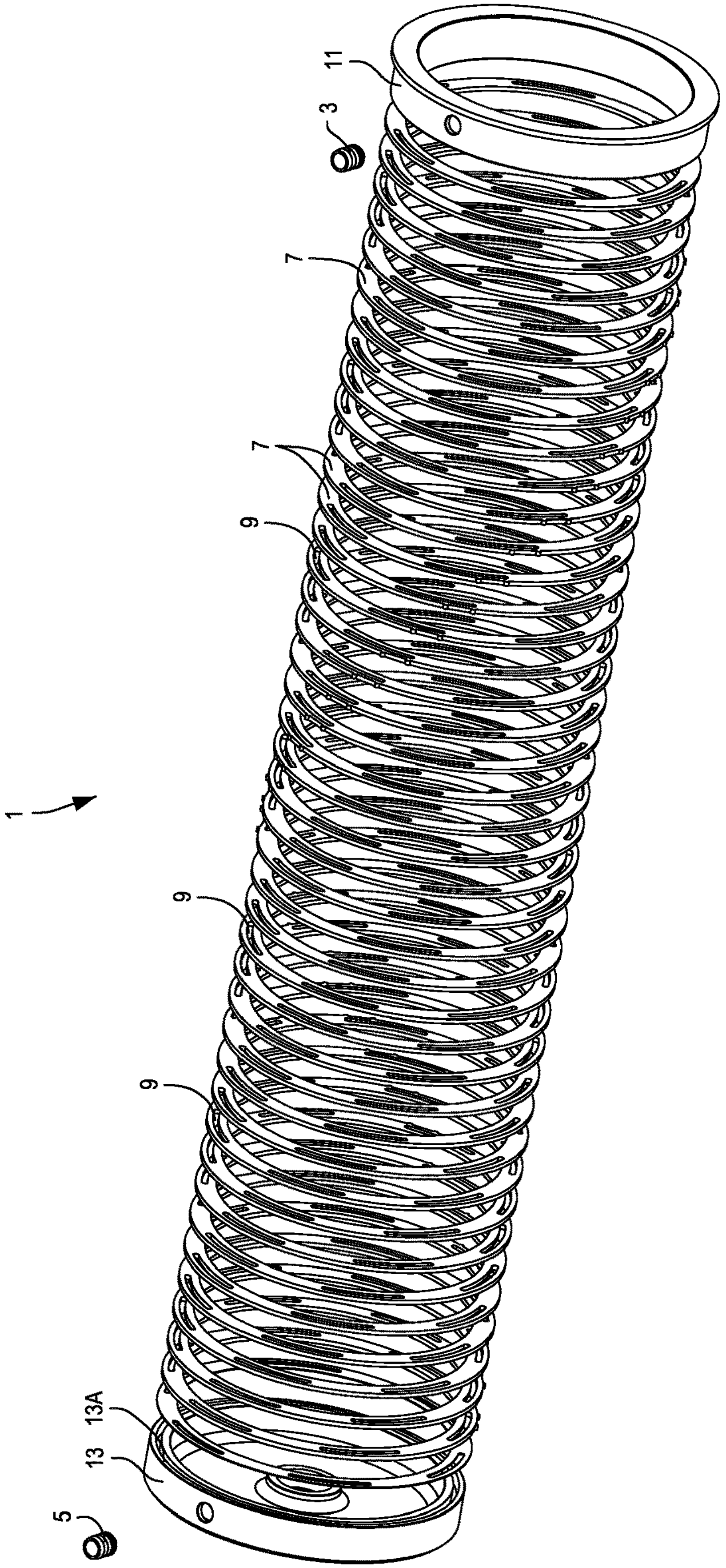
FIG. 15 is an exploded view of the casing of FIGS. 12 to 14.
Figure 15C:
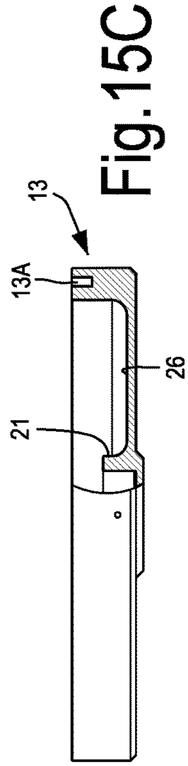
FIGS. 15A, 15B, 15C, 15D, and 15E are front views showing details of the components of the casing of FIGS. 12 to 15.
Figure 15D:
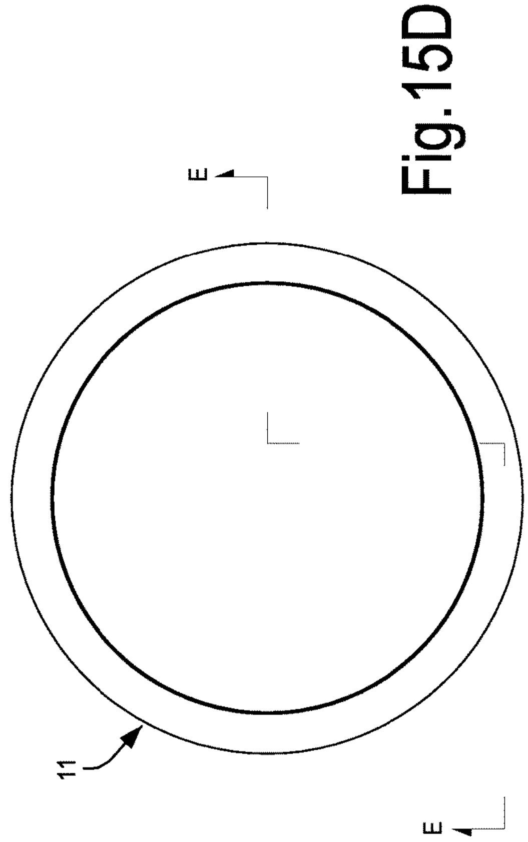
Figure 15E:
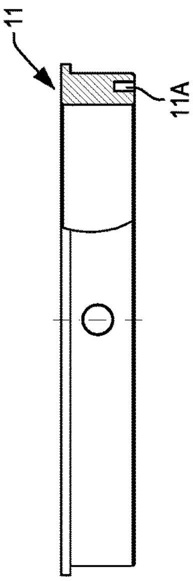

Namely, in the embodiment of FIGS. 12 to 15 the inlet manifold 11 is made in a single annular piece, in which an annular chamber 11A is provided, fluidly connected to the inlet connection 3 and to the ends of each cooling channel formed by the series of slots 9. The axial dimension of the annular chamber 11A can vary along the annular extension of the inlet manifold 11. The single annular piece forming the inlet manifold 11 is illustrated separate from the remaining part of the casing 1 in FIGS. 15D and 15E, wherein FIG. 15E is a cross-section according to the line E-E in FIG. 15D.

In this embodiment, also the outlet manifold 13 is made in a single piece, which in addition forms a rear closing flange 26. The single piece forming the outlet manifold 13 is shown in isolation in FIGS. 15B and 15C, wherein FIG. 15C shows a cross-section according to the line C-C in FIG. 15B. The seat 21 for the rear bearing is formed in a single piece with the body forming the annular manifold 13. Reference number 13A indicates an annular chamber fluidly connected to all the cooling channels formed by the slots 9 and to the outlet connection 5.

Figure 15A:
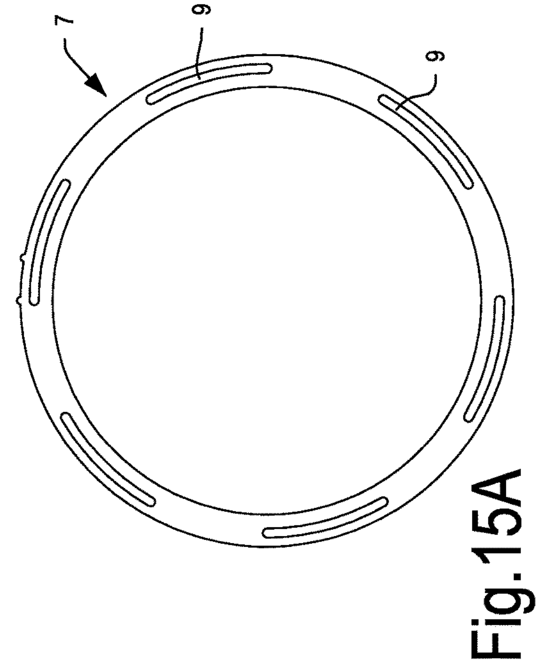
Figure 15B:
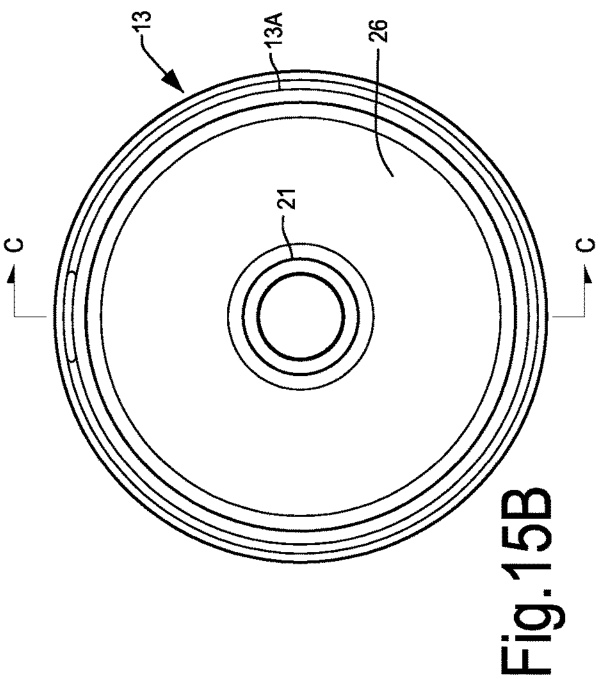

As in the embodiments described above, the body 8 of the casing 1 is formed by a plurality of rings 7 having through slots 9 distributed preferably at constant pitch around the axis of the rings 7, one of which is shown alone in FIG. 15A.

As in the embodiments above, the function of the inlet manifold 11 and the outlet manifold 13 and of the connections 3, 5 can be reversed; the inlet manifold with the inlet connection may be arranged on the back of the casing 1, while the outlet manifold and the outlet connection may be arranged in the front part of the casing 1.

The embodiment of FIGS. 12 to 15 is currently less preferred because producing the inlet manifold and the outlet manifold from a single piece is more expensive than producing them by assembling laminar components.

In all illustrated embodiments, the rings and/or the laminar elements forming the casing may be provided with radial appendices, indicated with 7A for the rings 7, which allow to easily arrange the rings and the laminar elements in mutual angular position, so as to have the correct shape of the cooling channels and of the inlet manifold and the outlet manifold inside the wall of the casing 1.

Figure 16:
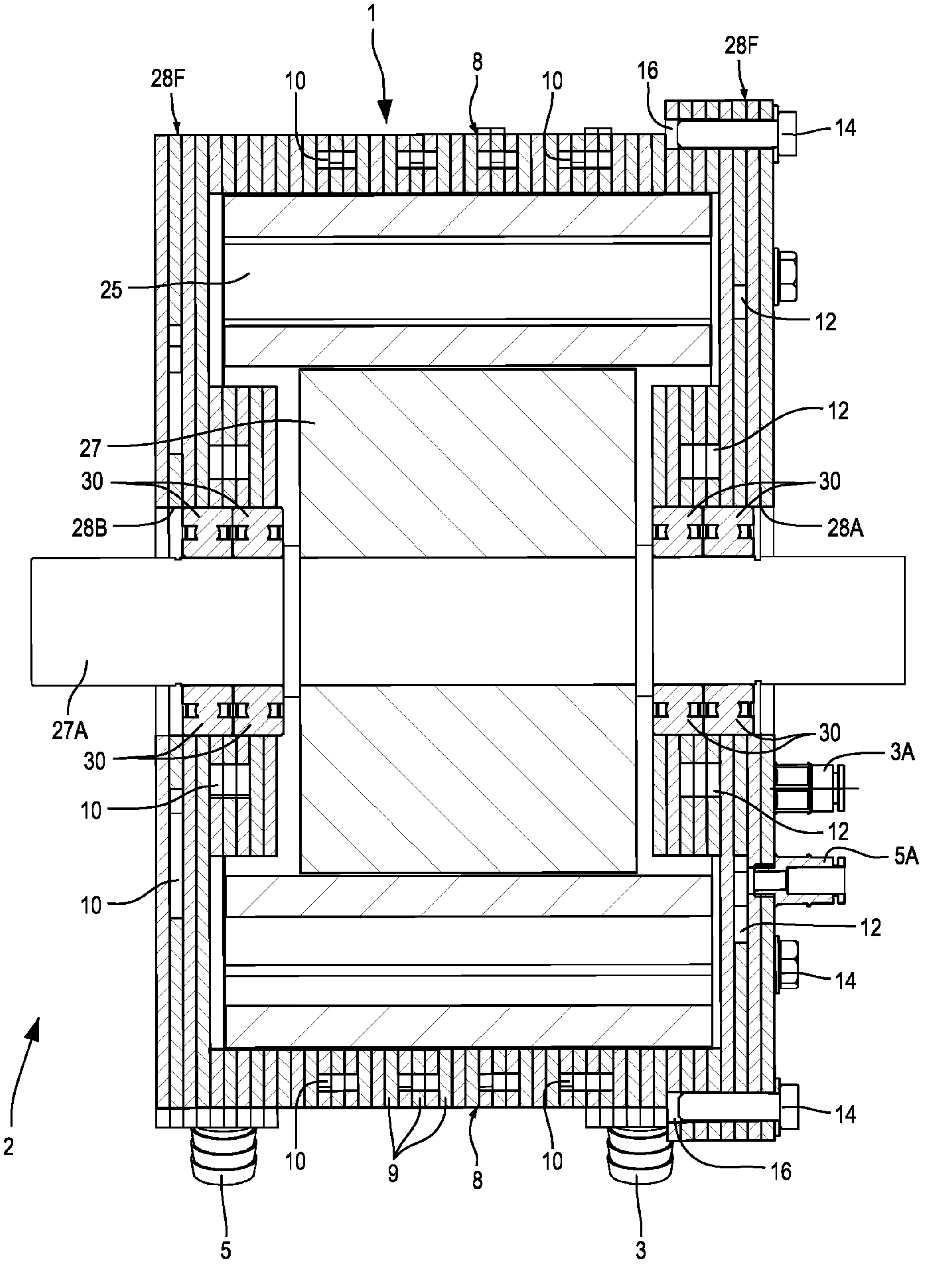
FIG. 16 is a longitudinal cross-section, according to a plane containing the rotation axis, of a motor with a casing according to the present invention.
Figure 17:
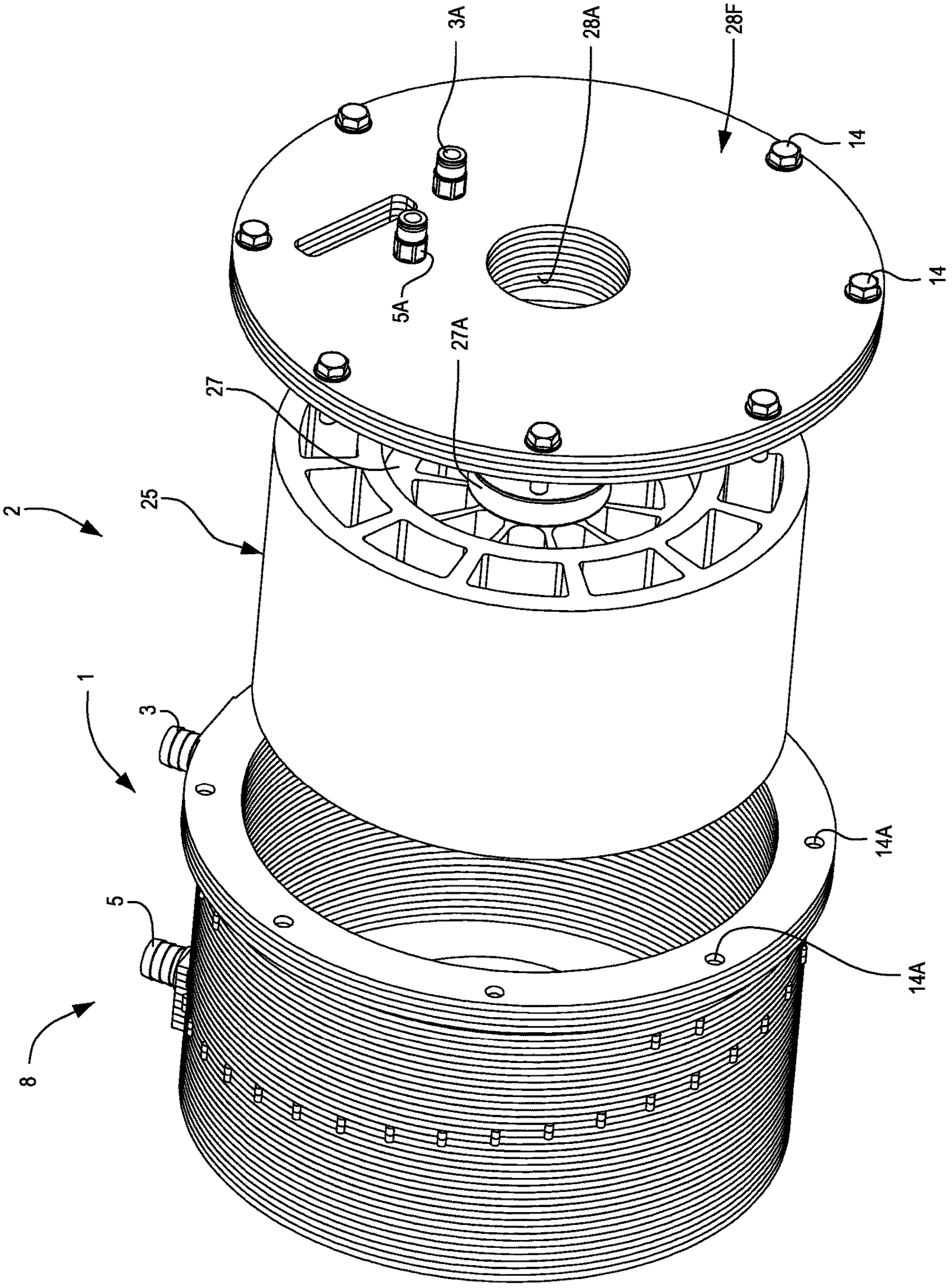
FIG. 17 is an exploded view of the motor of FIG. 16.

Embodiment of FIGS. 16 to 17

FIGS. 16 and 17 show a further embodiment of the invention, wherein reference number 2 indicates a motor having a casing 1 made substantially as described above, inside which a fixed stator 25 and a rotor 27 are housed. The rotor 27 is supported by a shaft 27A. In the embodiment of FIGS. 16 and 17 the output shaft projects from both the front flanges of the casing 1, but it shall be understood that in other embodiments the shaft may project from only one side of the casing.

In FIGS. 16 and 17, reference numbers 28F and 28T indicate a front flange and a rear flange, respectively. In the illustrated embodiment, both flanges 28F and 28T are made from rings 15 of metal sheet. In the embodiment of FIGS. 16 and 17, the flange 28T is made in a single piece with the central body of the casing 1, that is, the rings forming the flange 28T and the rings forming the main body of casing 1 are joined together, for example through braze welding, to form a single body. Instead of brazing, any other technique can be used for joining the rings, provided that it ensures leak-tightness and avoids leakages of liquid from the channels formed by the slots of the rings 15 when the rings are stacked over one another and joined together. In this way, as described above, the liquid coolant is prevented from entering the casing, where, if coming into contact with electrical conductors, it could cause short-circuits or other damages.

In the embodiment illustrated in FIGS. 16 and 17, analogously to what already described above with reference to other embodiments, the casing comprises seats for bearings supporting the shaft 27A of the rotor 27. In FIGS. 16 and 17, the bearings supporting the shaft 27A of the rotor 27 are indicated with the reference number 30 and are housed in a seat 28A provided in the front flange 28F and in a seat 28B provided in the rear flange 28T.

The seat 28B is formed by rings with slots forming one or more cooling channels as described above, fluidly connected to one or more cooling channels provided in the body of the casing 1. In the embodiment of FIGS. 16 and 17, part of the rings forming the seat 28B have smaller diameter than the remaining rings of the casing 1. In FIG. 16, the cooling channels formed in the body 8, in the rear flange 28T and in the seat 28B for the bearings 30 are generically indicated with reference number 10. These channels may be single or multiple, formed by sequentially stacking over one another slots 9 of rings 15, and are fluidly connected to the inlet and outlet connections 3, 5 for the coolant, in particular for a liquid coolant.

In the embodiment of FIGS. 16 and 17, the front flange 28F is formed by a body formed by joining rings of cut sheet with slots 9 to form one or more cooling channels inside the front flange 28F. The rings forming the front flange 28F also form the seat 28A for the front bearings 30. As shown in particular in FIGS. 16 and 17, the cooling channel(s) 12 formed inside the front flange 28F and the seat 28A for the bearings 30, are formed (as in the cases described above) by stacking over one another slots provided in the rings forming the flange 28F and the seat 28A. In some embodiments, the cooling channels 12 are not fluidly connected to the cooling channels 10. In this way, in the interface between the front flange 28F and the body 8 of the casing 1, no liquid coolant leakages can occur, and it is therefore not necessary ensuring leak-tightness or using particular gaskets. The front flange 28F may be applied to the body 8 of the casing 1 for example through screws 14 screwed in blind holes 14A formed in the front edge of the body 8 of the casing 1, with no need for liquid-tight gaskets.

To ensure cooling of the seat 28A for the bearings 30 associated with the front flange 28F, a coolant (in particular a liquid coolant) can be made circulate in the channel(s) 12 through an inlet connection 3A and an outlet connection 5A that are associated with the outer surface of the front flange 28F.

With this configuration, efficient cooling is achieved for the 8 body of the casing 1, the removable front flange 28F, the seat 28A for the front bearings, as well as the rear flange 28T and the seat 28B for the rear bearings. Advantageously, in the interface between body 8 and front flange 28A, where the components 8 and 28A must be physically separated, the liquid coolant does not flow and there is therefore no risk of coolant leaking into the casing 1, where the stator 25, the rotor 27 and the support bearings 30 are housed.

In less advantageous embodiments, the rings forming the front flange may be provided with through slots forming channels fluidly connected to the cooling channels 10 formed in the body of the case. In this case the connections 3A and 5A may be omitted. Or, the connections 3 and 5 can be omitted, and the coolant cooling the whole casing may be fed through the connections 3A, 5A. In this configuration, a gasket is suitably provided between the front flange 28F and the opposite edge of the body of the casing. The gasket may be perforated to allow the passage of the screws 14 and the cooling channels.

The invention claimed is:

1. A casing for an electric motor, the casing comprising
a plurality of first rings, stacked over one another along a longitudinal axis of the casing and joined together to form a casing central body, inside which a space is defined for housing a rotor and a stator of the electric motor; wherein:
each of the first rings comprises at least a first slot passing through the thickness of the respective first ring;
the first rings are stacked over one another along the longitudinal axis, so that the first slots of the first rings form, in sequence, a first cooling channel extending along the longitudinal extension of the casing; and
the first cooling channel is fluidly connected to an inlet connection and to an outlet connection for a coolant.

2. The casing of claim 1, wherein the casing comprises seats for support bearings supporting the rotor.

3. The casing of claim 1, wherein the first rings are joined together through a technique ensuring leak-tightness against the coolant flowing in the first cooling channel.

4. The casing of claim 1, wherein each of the first rings has two parallel flat faces orthogonal to the axis of the casing, the stacked first rings being joined together on the parallel flat faces.

5. The casing of claim 1, wherein each first ring comprises at least a second slot, angularly offset with respect to the first slot and passing through the thickness of the first ring; and wherein the second slots of the first rings stacked over one another form a second cooling channel extending along the longitudinal extension of the casing and fluidly connected to the inlet connection and to the outlet connection.

6. The casing of claim 1, wherein each slot has an elongated extension along a circumferential direction around the longitudinal axis of the casing.

7. The casing of claim 1, further comprising:
an inlet manifold for the coolant, fluidly connecting an inlet end of the first cooling channel and an inlet end of the second cooling channel to the inlet connection; and
an outlet manifold for the coolant, fluidly connecting an outlet end of the first cooling channel and an outlet end of the second cooling channel to the outlet connection.

8. The casing of claim 7, wherein at least one of the inlet manifold and outlet manifold comprises an approximately annular chamber fluidly connected to the first cooling channel, to the second cooling channel and to the inlet connection or the outlet connection.

9. The casing of claim 7, wherein the inlet manifold is joined, preferably through braze welding, to one of the first rings at a first end of the central body of the casing; and wherein the outlet manifold is joined.

10. The casing of claim 7, wherein at least one of the inlet manifold and the outlet manifold is formed by a plurality of second coaxial rings joined together, each of which is provided with at least one opening passing therethrough; wherein the through openings form a chamber fluidly connecting the cooling channels to each other and to the inlet connection or to the outlet connection, respectively; and wherein the inlet connection or the outlet connection is fastened to the plurality of second rings forming the inlet manifold or the outlet manifold.

11. The casing of claim 10, wherein the second rings are joined together through braze welding; and wherein each of the second rings has two parallel flat faces orthogonal to the axis of the casing.

12. The casing of claim 7, wherein at least one of the inlet manifold and outlet manifold is adjacent to a rear closing flange of the casing and the other of the inlet manifold and outlet manifold is adjacent to a front closing flange of the casing; wherein the rear closing flange comprises a rear seat for a rear support bearing supporting a shaft of the electric motor; and wherein the front closing flange comprises a front seat for a front support bearing supporting the shaft of the electric motor, the front closing flange having a through hole for the shaft of the electric motor.

13. The casing of claim 12, wherein at least one of the front seat and rear seat is formed by a plurality of laminar elements joined together.

14. The casing of claim 13, wherein the laminar elements form the inlet manifold or the outlet manifold, fluidly connecting the cooling channels to the inlet connection or to the outlet connection.

15. The casing of claim 13, wherein the laminar elements comprise through openings defining a cooling circuit for the respective seat, fluidly connected to the inlet connection or to the outlet connection; the cooling circuit of the seat being adapted to remove heat from the seat.

16. The casing of claim 13, wherein each laminar element comprises:

a perimeter annular portion, aligned, along the longitudinal axis of the casing, with the first rings;

a central annular portion, defining at least one portion of the front seat or of the rear seat;

at least a radial element joining the perimeter annular portion and the central annular portion together;

wherein the perimeter annular portion, the central annular portion and the radial element comprise openings passing through the thickness of the laminar element and defining a connection.

17. The casing of claim 1, wherein the slots of the first rings are angularly offset with respect to one another, so that each cooling channel has a helical extension around the axis of the casing.

18. The casing of claim 1, comprising a closing flange that can be applied to the central body of the casing in removable fashion; wherein the closing flange is formed by a plurality of rings joined together and comprising respective slots passing through the thickness of each ring and forming at least one cooling channel of the closing flange; and wherein the cooling channel of the closing flange is fluidly connected to an inlet connection and an outlet connection for the coolant.

19. The casing of claim 18, wherein the cooling channel of the closing flange is fluidly separated from each cooling channel in the central body of the casing; and wherein the inlet connection and the outlet connection are carried by the closing flange.

20. The casing of claim 18, wherein the closing flange forms, together with an additional plurality of rings stacked over one another and joined together, a seat for a bearing supporting the rotor; and wherein the rings forming the bearing seat are provided with slots passing through the thickness of the rings, the slots forming part of the at least one cooling channel of the closing flange.

21. An electric motor comprising:

a casing according to claim 1;

a stator stationary housed in the casing; and a rotor housed to rotate in the casing and supported by bearings provided in seats for the bearings supporting the rotors, the seats being integral with the body of the casing and/or with a removable closing flange.

22. A method for producing a casing for an electric motor, the casing defining a space for housing a stator and a rotor of the electric motor, the method comprising the following steps:

stacking a plurality of first rings over one another along a common longitudinal axis defining the axis of the casing; wherein each first ring comprises at least a first slot passing through the thickness of the respective first ring; and wherein the first rings are so angularly positioned with respect to one another that the first slots of the first rings form a first cooling channel extending along the longitudinal axis; and joining the first rings together forming a central body of the casing.

23. The method of claim 22, comprising the step of applying a rear closing flange to the central body of the casing.

24. The method of claim 22, wherein the casing comprises seats for support bearings supporting a rotor.

25. The method of claim 22, wherein each first ring comprises at least a second slot, angularly offset with respect to the first slot and passing through the thickness of the respective first ring; and wherein the first rings are so angularly positioned with respect to one another that the second slots of the first rings form a second cooling channel extending along the longitudinal axis.

26. The method of claim 25, comprising the step of applying, to the central body of the casing, an inlet manifold and an outlet manifold, fluidly connected to an inlet connection and to an outlet connection; wherein an inlet end of the first cooling channel and an inlet end of the second cooling channel are fluidly connected to the coolant inlet manifold; and wherein an outlet end of the first cooling channel and an outlet end of the second cooling channel are fluidly connected to the coolant outlet manifold.

27. The method of claim 26, comprising the step of constructing at least one of the inlet manifold and outlet manifold by stacking over one another and joining together a plurality of second rings, each of which is provided with an opening passing therethrough; wherein the through openings of the second rings form a chamber fluidly connecting the cooling channels to each other and to the inlet connection or to the outlet connection; and wherein the inlet connection or the outlet connection is fastened to the plurality of second rings.

28. The method of claim 22, comprising the step of forming at least one seat for a support bearing by stacking over one another and joining together a plurality of laminar elements.

29. The method of claim 28, wherein the laminar elements comprise through openings defining a cooling circuit for the seat, fluidly connected to the inlet connection or to the outlet connection.

* * * * *